(12) United States Patent
Dragone

(10) Patent No.: US 6,873,766 B2
(45) Date of Patent: Mar. 29, 2005

(54) EFFICIENT WAVEGUIDE ARRAYS WITH NEARLY PERFECT ELEMENT PATTERNS

(76) Inventor: Corrado P. Dragone, 43 Windsor Dr., Little Silver, NJ (US) 07739

(*) Notice: Subject to any disclaimer, the term of this patent is extended or adjusted under 35 U.S.C. 154(b) by 0 days.

(21) Appl. No.: 10/410,845

(22) Filed: Apr. 10, 2003

(65) Prior Publication Data
US 2003/0194181 A1 Oct. 16, 2003

Related U.S. Application Data
(60) Provisional application No. 60/372,707, filed on Apr. 12, 2002.

(51) Int. Cl.[7] .............................. G02B 6/26; G02B 6/42
(52) U.S. Cl. ............................. 385/39; 385/24; 385/37; 385/43
(58) Field of Search ............................. 385/14, 15, 24, 385/37, 39, 43, 45; 398/89, 87

(56) References Cited
U.S. PATENT DOCUMENTS

| | | |
|---|---|---|
| 4,004,042 A | 1/1977 | Fairbairn |
| 4,904,042 A | 2/1990 | Dragone |
| 5,002,350 A | 3/1991 | Dragone |
| 5,136,671 A | 8/1992 | Dragone |
| 5,745,618 A | 4/1998 | Li |
| 6,058,233 A | 5/2000 | Dragone |
| 6,512,864 B1 * | 1/2003 | Lin et al. .................. 385/24 |
| 2002/0131704 A1 | 9/2002 | Doerr |
| 2003/0063858 A1 * | 4/2003 | Bulthuis et al. ............. 385/37 |
| 2003/0081898 A1 | 5/2003 | Tabuchi et al. |

* cited by examiner

Primary Examiner—Hemang Sanghavi
(74) Attorney, Agent, or Firm—Mathews, Collins, Shephard & McKay, P.A.

(57) ABSTRACT

An optical interconnection apparatus including waveguide arrays such as waveguide lenses, waveguide gratings and star couplers, has improved efficiency realized by using a periodic array including in each period a combination of two radial waveguides. The array is formed with angular period $\alpha$ between an input circle and an output circle and it includes an input section, connected to the input circle, and an output section connected to the output circle. The input section includes a single waveguide in each period and it is efficiently coupled with minimal loss to the output section, whose waveguides are approximately arranged with period $\alpha/2$ in the final region close to the output circle.

20 Claims, 12 Drawing Sheets

EFFICIENT WAVEGUIDE ARRAYS WITH NEARLY PERFECT ELEMENT PATTERNS

CROSS REFERENCES TO RELATED APPLICATIONS

This application claims the benefit under 35 U.S.C. 119(e) of U.S. Provisional Application Ser. No. 60/372,707, entitled Efficient Waveguide Arrays With Nearly Perfect Element Patterns, filed on Apr. 12, 2002.

FIELD OF THE INVENTION

This invention relates to waveguide arrays in optical and radio systems, and more particularly, to waveguide arrays having improved efficiency for wavelength routers and star couplers in integrated optics.

BACKGROUND OF THE INVENTION

Waveguide arrays are used at radio and optical wavelengths. In particular they are used at optical wavelengths to realize imaging lenses and gratings in wavelength routers. One such wavelength grating router is described in U.S. Pat. No. 5,136,671, issued on Aug. 4, 1992. As shown in FIG. 1, this router is an imaging arrangement formed by a waveguide grating and it is generally composed of two dielectric slabs 101 and 102, two periodic arrays 103 and 104, and a set of waveguides (grating arms) 105, of different lengths between the two arrays. Typically, in commercial routers the loss exceeds 3 db for the central ports of the router and, for the marginal ports it often exceeds 6 db. Such losses seriously limit the usefulness of the router for passive networks and applications such as channel dropping filters with stringent requirements on loss uniformity. It is generally important to improve uniformity, by reducing the difference between maximum and minimum loss. The above loss variation is primarily caused by the two periodic arrays connected to the waveguides forming the grating. It is caused by scattering at the two junctions where the radial waveguides of the two periodic arrays connect to the input and output slabs. Efficient router arrays are currently realized by means of transitions that are difficult to realize with low loss because this would require very small gaps 110, between adjacent waveguides. Thus, there is continuing need to reduce this loss and its uniformity. An important result, which is obtained by reducing the loss, is that the array element pattern then approaches a rectangular function. Because of this, the array can then be used to realize rectangular transfer functions in a wavelength slicer.

SUMMARY OF THE INVENTION

The present invention, efficient waveguide arrays with nearly perfect element patterns, provides essentially nearly ideal planar imaging by using waveguide arrays. An optical interconnection apparatus including waveguide arrays such as waveguide lenses, waveguide gratings and star couplers, has improved efficiency realized by using a periodic array including in each period a combination of two radial waveguides. The array is formed with angular period $\alpha$ between an input circle and an output circle and it includes an input section, connected to the input circle, and an output section connected to the output circle. The input section includes a single waveguide in each period and it is efficiently coupled with minimal loss to the output section, whose waveguides are approximately arranged with period $\alpha/2$ in the final region close to the output circle.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

In the following description, identical element designations in different figures represent identical elements. Additionally in the element designations, the first digit generally refers to the figure in which that element is first located (e.g., 102 is first located in FIG. 1).

The present invention, efficient waveguide arrays with nearly perfect element patterns, provides the realization of nearly ideal planar imaging by using waveguide arrays. To this purpose, each array must be characterized to a good approximation by a rectangular element pattern. In one embodiment the array consists essentially of an adiabatic transition that is initially periodic with period $\alpha$ and it becomes periodic with period $\alpha/2$ at the end of the transition. The array element pattern in this case is almost exactly a rectangular pattern with negligible loss. However, a disadvantage of this array is that it requires a very long transition, which may be difficult to realize with sufficient accuracy. Therefore the present invention is also concerned with simplifying the fabrication problem by reducing the array dimensions. In the most general embodiment, a low loss waveguide array is implemented by using a periodic arrangement of radial elements with focal point F and angular period $\alpha$. The array is formed between an input circle and an output circle and each element in the array region close to the output circle includes two waveguides arranged so that the array in this region is approximately periodic with period α/2. The waveguides and the gaps between them may be continuous or vary in steps or be segmented. In order to reduce the array dimensions one can use, instead of a long transition, a relatively short transition, in which case the optimization of the array parameters requires in general that their final values on the output circle be slightly different from those producing period α/2. Important applications of this array include star couplers and wavelength routers.

Router Description

Figure 1:
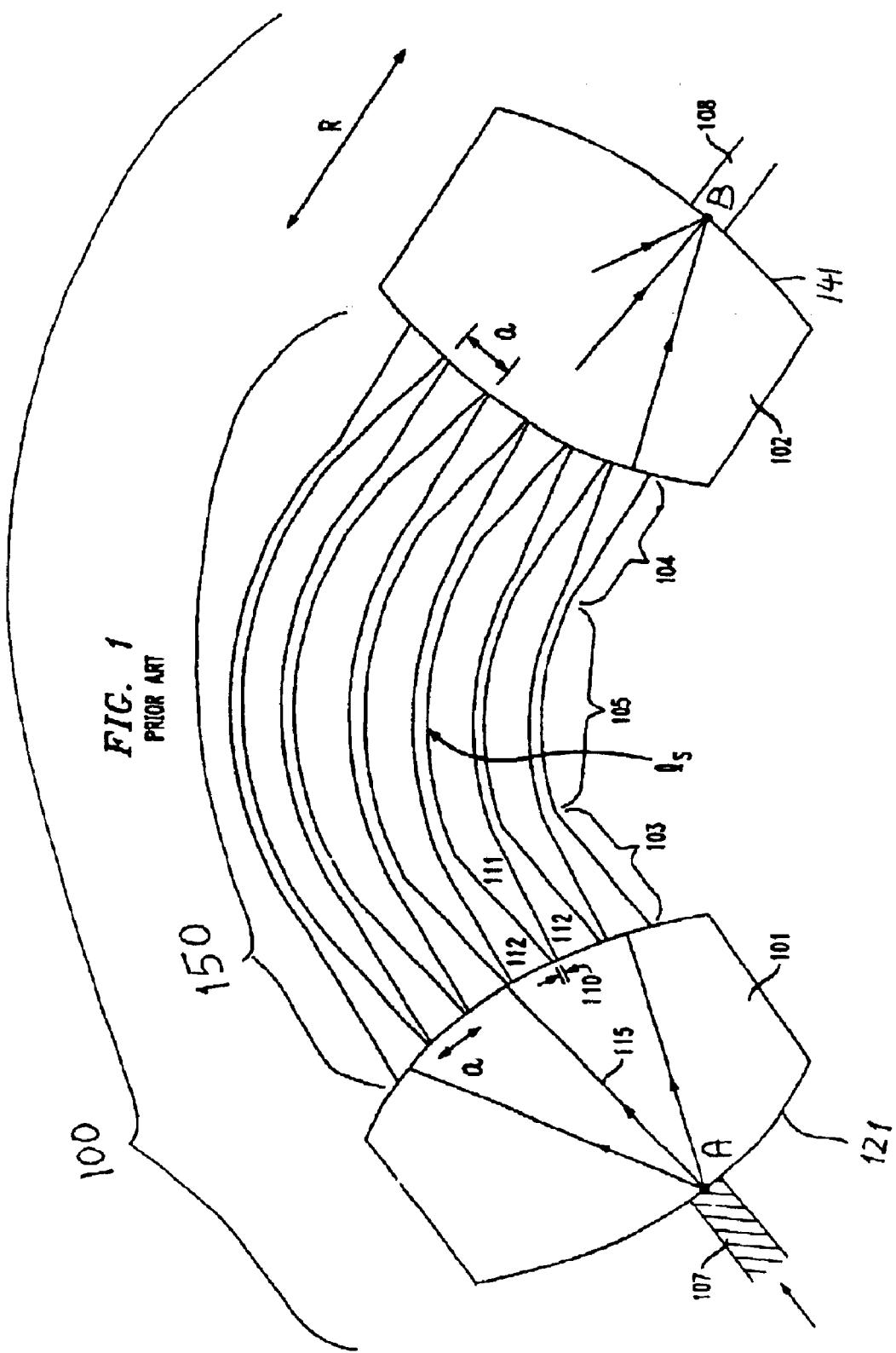
FIG. 1 illustrates the basic prior art form of optical wavelength router or grating.

FIG. 1 shows the basic structure of a prior art imaging arrangement 100 involving periodic arrays of the form used in the present invention. Note the imaging arrangement will also be referred to herein as a router. The imaging arrangement 100 is described in U.S. Pat. No. 5,002,350 which issued on Mar. 26, 1991, U.S. Pat. No. 5,136,671 which issued on Aug. 4, 1992 and U.S. Pat. No. 6,058,233 which issued on May 2, 2000 and are incorporated by reference as if set out in full. The imaging arrangement 100 includes an input section 101 and an output section 102 spaced apart and interconnected by a grating 150 consisting of an appropriate plurality of optical waveguide arms 105 connected between two periodic arrays of radial waveguides. The input and output sections typically are each free-space slabs, such as star couplers, and the arrangement has the property that wave energy applied by an input waveguide 107 acting as a point source A forms a plurality of output images, of which three are shown as $B_0$, $B_1$, $B_2$ in FIG. 2. The optical waveguide arms 105 typically are thin narrow layers (planar strips) of silica core supported on a planar silicon wafer, as known in the art.

In a conventional imaging arrangement or router, the input and output ports are connected to the input and output sections 101 and 102 along portions of two circles that are typically referred to as the input 121 and output 141 circles. For simplicity, FIG. 1 shows only one input 107 and one output 108 port.

The result is a router that produces a wavelength dependent output image of each input signal. The location of each output image is determined by its wavelength λ and therefore, signals of different wavelengths from a particular input port give rise to separate images that can be received by different output ports. Typically optical fibers are used for applying input signals to the input ports and for extracting output signals from the output ports. In practice, several output ports will be needed, if the router is to send signals to different destinations. Similarly, several input ports will be needed, in order to receive signals from different inputs. In wavelength division optical networks, the different wavelengths would represent different communication channels.

The properties of the arrangement of FIG. 1 are best described next by considering its imaging properties in response to an input signal of variable wavelength λ applied to the input waveguide 107. The input signal in FIG. 1 is radiated from the waveguide location towards the receiving apertures of the radial waveguides 103 connected to the arms 105 forming the grating 150. As discussed earlier, there would be an appropriate number of arms in the grating 150. At a particular input wavelength, each arm receives a component of the input signal. The signal is therefore split into many components, each traveling along a particular arm. Each arm applies to its component an appropriate phase shift, which is wavelength dependent, and it is proportional to the optical path length of the arm. In a conventional router, successive arms are characterized to a good approximation by a constant path length difference. Then, one finds that the various signal components radiated by the arms towards the output curve, all add in phase at certain locations on the output curve 241 shown in FIG. 2. As a result, several images $B_0$, $B_1$, $B_2$ of the input signal are produced on the output curve 241. These images represent different orders of the grating and they have three basic properties. First, their locations vary with the wavelength λ. Second, their intensities also vary, and they are determined by the radiation characteristics of the periodic array 204. Third, the images are equally spaced with spacing Ω determined by the angular spacing α of the array elements, $$\Omega = \frac{\lambda}{\alpha} \tag{1}$$

Of greatest importance in a conventional router is the central image $B_0$ of highest intensity. This is the image closest to the focal point F of the arms and it is called the principal image. This image is produced inside the central zone, which is an interval 242 of width Ω centered at F. The remaining images (higher orders) such as $B_1$,$B_2$ are produced outside the central zone. These images typically have appreciably smaller intensity in all cases except when they are close to the boundaries $P_1$,$P_2$ of the central zone.

Figure 2:
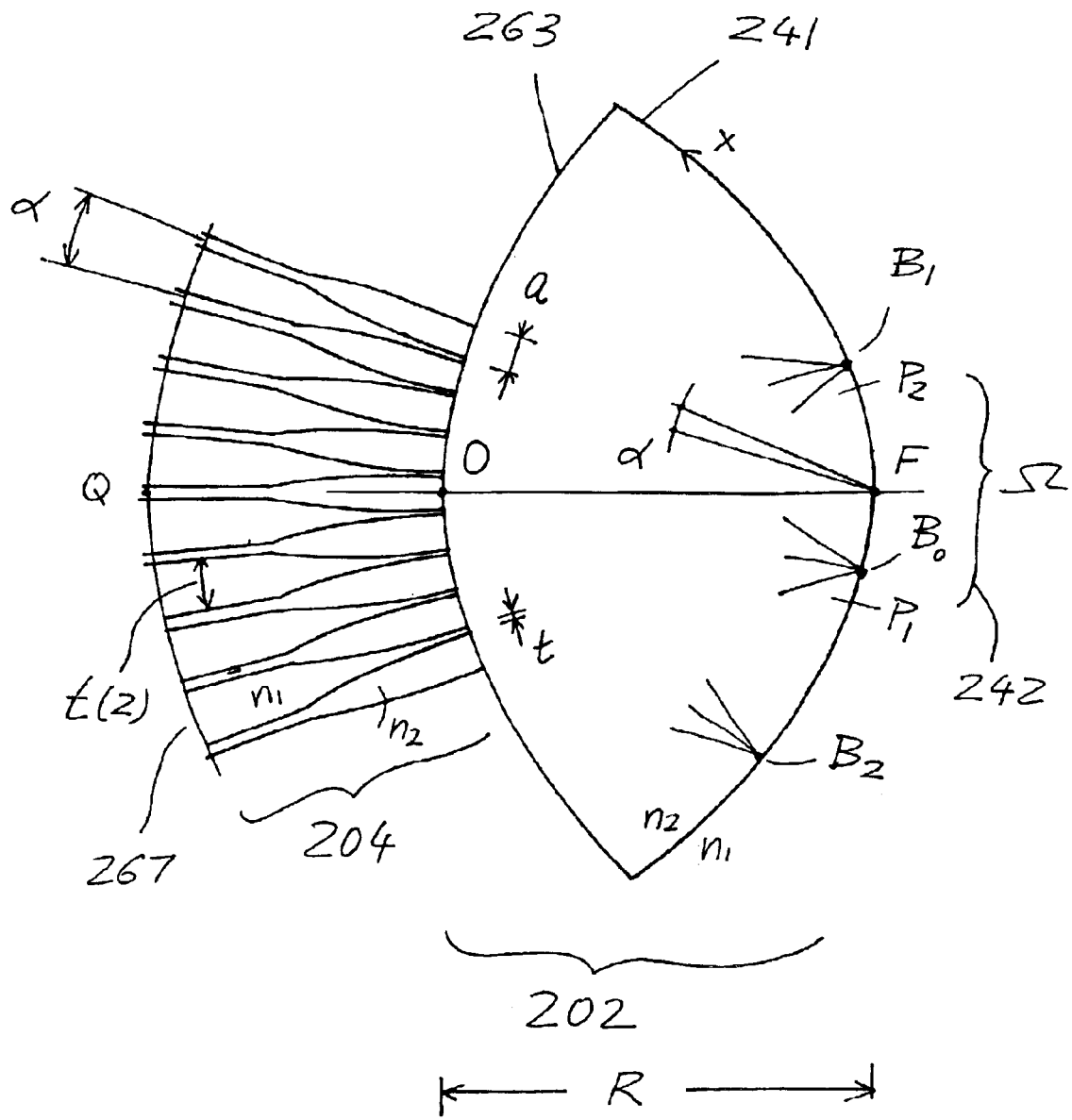
FIG. 2 shows an arrangement consisting of a dielectric slab connected to a conventional array of radial waveguides with virtual focal point F.

In a conventional router, all the output ports or waveguides are located inside the central zone (which in FIG. 2 represents the field of view $P_1$,$P_2$ of the router) and receive only the images produced in the central zone. In FIG. 1, only one output waveguide 108 is shown for simplicity, and the input signal is efficiently transmitted to this waveguide at those wavelengths for which the principal image location coincides with the particular waveguide location B. As pointed out earlier, $B_0$ is defined as the particular image inside the central zone $P_1$,$P_2$. Therefore the variation of $B_0$ is a periodic (cyclic) function of the signal wavelength. In each period, the variation exactly covers the entire central zone $P_1$,$P_2$. As a result, the transmission coefficient has periodic behavior consisting of equally spaced maxima. Each maximum corresponds to a wavelength for which the image $B_0$, coincides with the output waveguide location. The period, given by the wavelength spacing $\lambda_f$ between maxima, is called the free-spectral range. In a conventional router images produced outside the central zone (e.g., $B_1$, and $B_2$ of FIG. 2) are considered useless and so undesirable. Therefore, minimizing their intensities generally optimizes the router. To this purpose one must optimize the radiation characteristics of the periodic array 204, since these radiation characteristics affect the intensities of the various images. Here the radiating apertures of the arms are arranged periodically (with angular period 'α' in FIG. 2), thus forming a periodic array, and therefore each aperture produces the same radiation pattern, called the element pattern of the array.

The element pattern of a periodic array is simply [see Dragone, C., "Optimum Design of a Planar Array of Tapered Waveguides," J. Opt. Soc. Amer. A., Vol. 7, No. 11, pp. 2081–2093, November 1990 and Dragone, C., "Theory of Wavelength Multiplexing With Rectangular Transfer Functions", IEEE Journal of Selected Topics in Quantum Electronics, Vol. 8, No 6, November 2002, pp.1168–1177] the power density produced, on the focal circle, by applying unit power to one particular element (located in a period α). On the other hand, the array efficiency [see Dragone, C., "Optimum Design of a Planar Array of Tapered Waveguides." J. Opt. Soc. Amer. A., Vol. 7, No. 11, pp. 2081–2093, November 1990 and Dragone, C., "Theory of Wavelength Multiplexing With Rectangular Transfer Functions", IEEE Journal of Selected Topics in Quantum Electronics, Vol. 8, No 6, November 2002, pp.1168–1177] is obtained by simultaneously exciting all the array elements, with a constant phases difference between adjacent elements. Then, the efficiency E at any particular image location B is defined as the fraction, of the total power supplied to the array that is transferred to that particular image location B. For a periodic array, a remarkable property of the function E(B) giving the efficiency variation on the focal circle is that E(B) coincides with the array element pattern. That is, the problem of optimizing E(B) is identical to the problem of optimizing the element pattern. Ideally, one would like to design the array so that all secondary images are zero, in which case the element pattern becomes a rectangular function characterized by unity efficiency inside the central zone and zero outside, that is $$E(B) = rect_{106}(B) \tag{2}$$

Notice, from power conservation, the loss $Loss(B_0)=1-E(B_0)$ in the central zone is simply the sum of the powers $E(B_1), E(B_2)$, etc transferred to secondary images. In a conventional array, the two most important images with the greatest intensities are the principal image $B_0$ and the secondary image $B_1$ that is closest to the central zone. We call $B_1$ the first secondary image. In a conventional array this is the strongest secondary image, and it is responsible for most of the array loss.

Figure 3A:
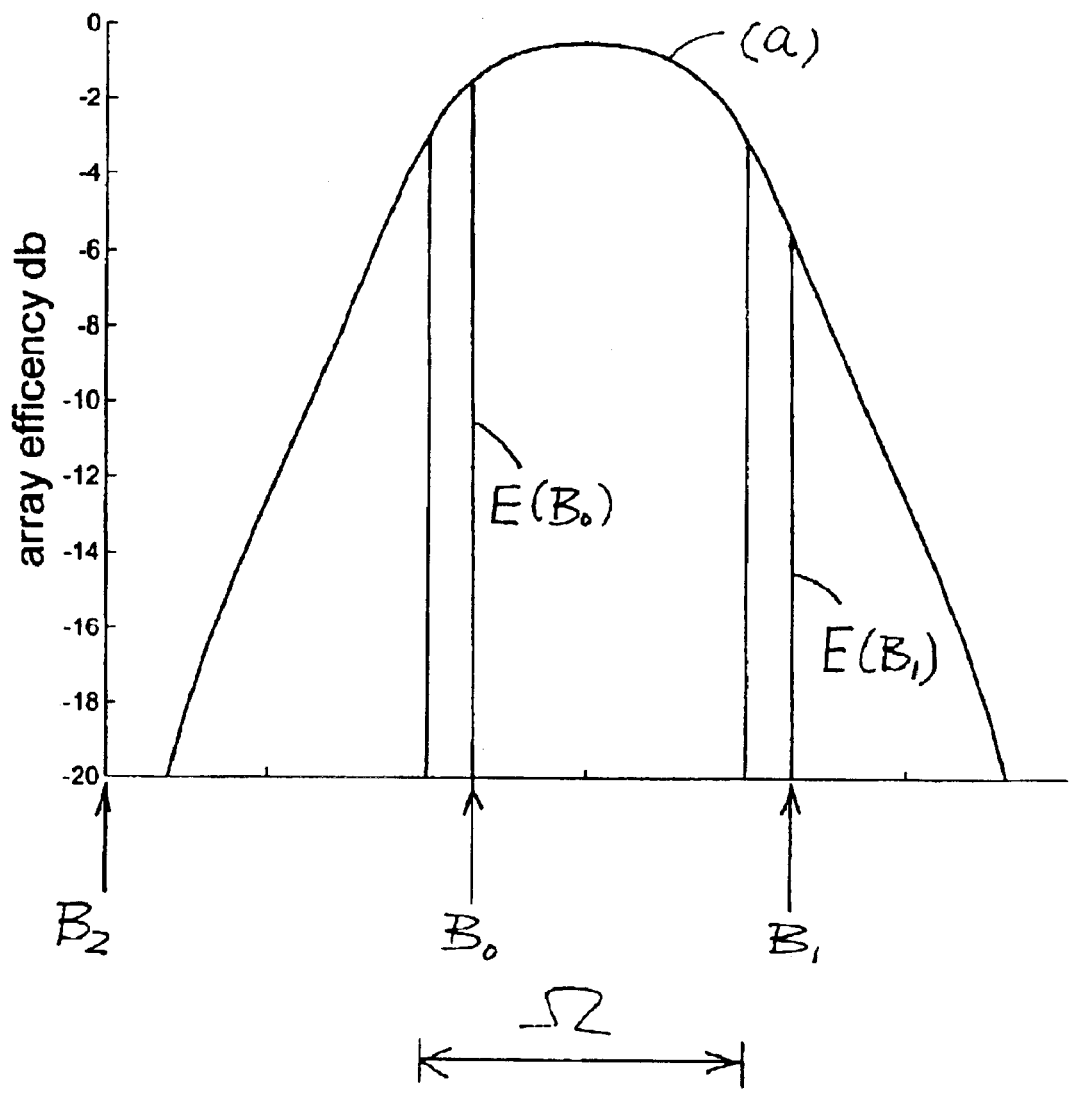
FIG. 3a shows the array efficiency given by the element pattern (a) of a conventional array.

FIG. 2 shows in greater detail a prior art array formed by a periodic arrangement of radial waveguides with focal point F and angular spacing $\alpha$ between adjacent waveguides. The arrangement consists of strip waveguides that can be realized in integrated form by using for instance strips of silica core sandwiched between cladding layers of lower refractive index $n_1 < n_2$ where $n_2$ is the core index. The arrangement of FIG. 2 consists of an array combined with a dielectric slab 202 formed between two circles 263, 241, respectively through the array focal point and the center O of the array aperture. The array is realized between two concentric circles centered at the array focal point F. The first circle 267 is connected to the input waveguides (not shown). The second circle 263 contains the waveguides apertures. The array elements are simply guiding strips of higher refractive index $n_2$ separated by lower index $n_1$ forming the gaps between adjacent strips as shown in FIG. 2. By using this type of array, the efficiency in the central zone is maximized by using, between the above two circles, a gradual transition in which the gap t(z) is a monotonically decreasing function of the radial distance z from the focal point F. Indeed, if the transition is very gradual, and the gap gradually goes to zero, then one can show that the array element pattern will approach a rectangular element pattern. On the other hand, by using conventional silica waveguides, the final gap value at the end of the transition must realistically exceed about 2 microns. Then, the discontinuity caused by the nonzero gap at the array junction with the slab, is responsible for substantial loss, as shown for example by curve (a) of FIGS. 3a and b. Also shown in FIG. 3b for comparison is curve (b) calculated as shown later by assuming a gradual variation t(z) which goes to zero at the array junction. In both cases the largest loss occurs when the principal image $B_0$ is close to either edge of the central zone, and one can see from FIG. 3a that the only significant secondary image in this case is $B_1$. Therefore, since all other secondary images can be ignored, the loss is primarily caused by $B_1$ and one obtains approximately $Loss(B_0) \approx E(B_1)$. In both cases (a, b) one can show that the array efficiency is primarily determined by the variation of the quantity $$Q = Q(z) = \frac{\Delta n}{n} t(z) a(z), \tag{3}$$

where $a(z)=\alpha z$ is the period determined by the distance z from the focal point F, and $\Delta n = n_2 - n_1$ is the contrast.

Figure 4:
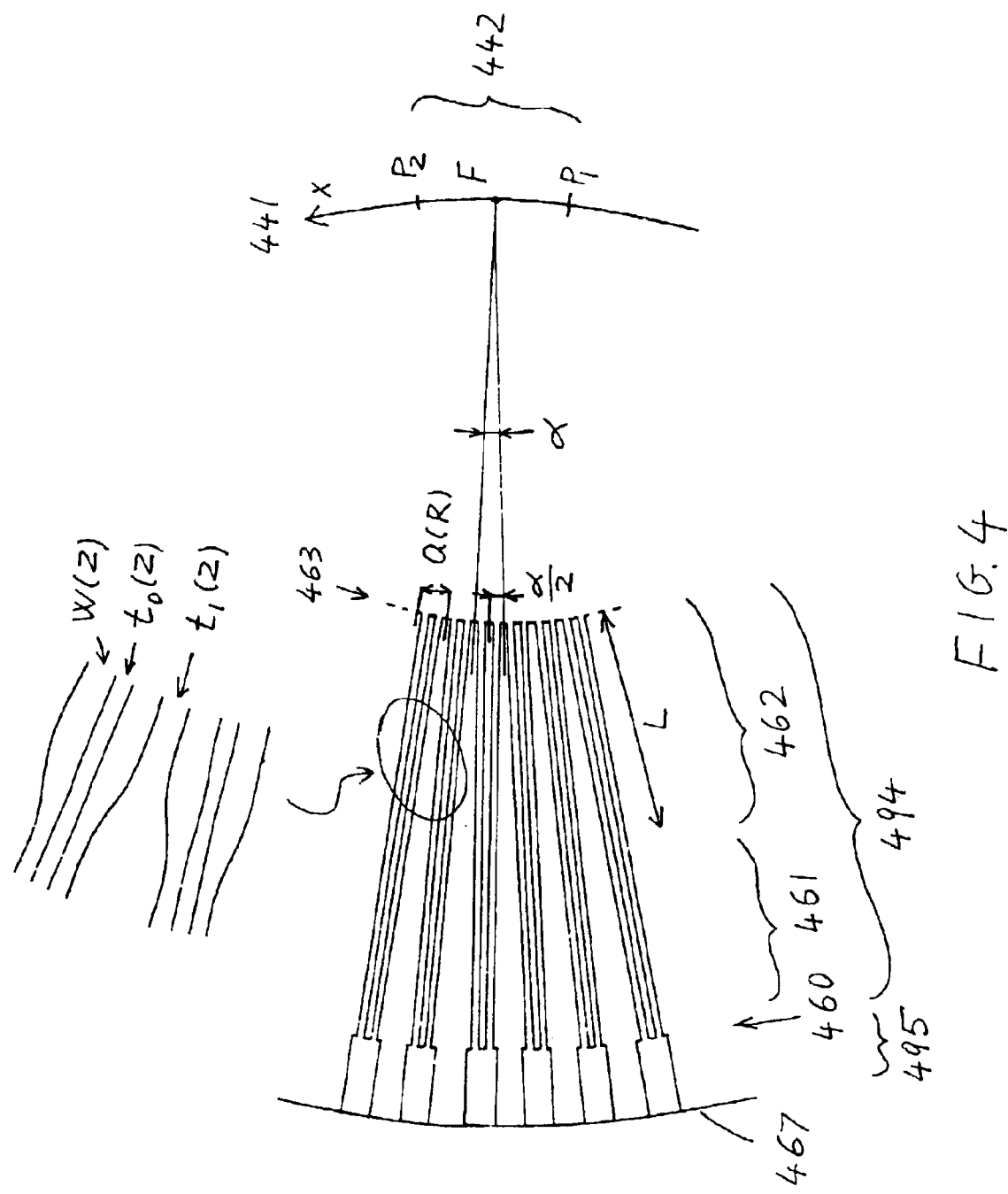
FIG. 4 shows a first embodiment of the present invention, consisting of a periodic arrangement of Y-branches combined with radial waveguides having their apertures arranged periodically with period $\alpha/2$.

In summary, in a conventional array with a nonzero gap value at the array junction 263 with the slab 202, substantial loss is caused by the periodic discontinuity caused by the nonzero gaps at the junction 263. This loss is primarily caused by one particular Fourier component of the above discontinuity, namely the first Fourier component. This is the component that is primarily responsible for the unwanted image $B_1$ and, by eliminating this Fourier component the array loss will also be substantially eliminated. The present invention is based on this result. The present invention substantially eliminates the above Fourier component by modifying the array geometry as shown in FIG. 4. Now, instead of a single waveguide, a pair of waveguides with gaps $t_0(z), t_1(z)$ is included in each element. The above Fourier component is now determined by the difference $t(z)=t_1(z)-t_0(z)$. Thus, the loss caused by the end discontinuity 463 is substantially eliminated by simply choosing $t_0(z) \approx t_1(z)$ in the vicinity of the array junction 463 for z=R. Indeed, if this condition is satisfied, the array in the junction vicinity becomes periodic with period $\alpha/2$ equal to half the actual array period $\alpha$, and this can be shown to cause the above Fourier component to vanish, at the end 463 of the transition. By using a gradual transition, it is now possible to accurately produce a rectangular element pattern. An important transition parameter is again the above parameter Q(z) except that now $t(z)=t_1(z)-t_0(z)$. Therefore t(z) can now gradually go to zero, by using a transition with realistic gap values.

Notice the loss of a conventional array was reduced previously by using segmentation, which is described in U.S. Pat. No. 5,745,618 which issued on Apr. 28, 1998 but this technique is only suitable if the number of segments is small. In particular, the rectangular element pattern of FIG. 3B cannot be realized by using a conventional array segmented by the above technique, since this would require a very large number of segments, and it would result in poor performance because of unwanted resonances by the segments. Accordingly, my technique is needed in order solve this problem. A different technique for improving efficiency is described in U.S. Pat. No. 6,058,233 which issued on May 2, 2000 and in Sugita, A, etc.: "Very low Insertion Loss Arrayed-Waveguide Grating With Vertically Tapered Waveguides", IEEE Photon. Technol. Lett., 12, pp.1180–1182, September 2000, but it is more difficult to realize, since it requires additional fabrication steps. Therefore the technique of the present invention is generally preferable, since it is does not require additional fabrication steps. Furthermore, the technique of the present invention can be in some cases combined advantageously with the above techniques, to further improve performance, and one important example is disclosed later on.

Illustrative Embodiments

A purpose of this invention is to maximize the array efficiency in the central zone by using a suitable transition. The transition is formed between the array input circle 467, connected to the input waveguides, and the array output circle 463 connected to the slab. The transition loss is caused in general by power conversion from the fundamental supermode, produced by the input excitation, to unwanted supermodes (Dragone, C., "Optimum Design of a Planar Array of Tapered Waveguides," J. Opt. Soc. Amer. A., Vol. 7, No. 11, pp. 2081–2093, November 1990). One can show that each unwanted mode primarily contributes to a particular unwanted image, determined by the mode order. Indeed, each unwanted image $B_s$ is entirely caused by power transfer from the fundamental supermode of the transition to a particular supermode corresponding to $B_s$. Here we use the notation $\Psi_0, \Psi_1, \Psi_2$ for the supermodes corresponding respectively to the images $B_0, B_1, B_2$. Therefore $\Psi_0$ is the fundamental mode, responsible for $B_0$, the next higher order mode $\Psi_1$ is responsible for $B_1$, which is the closest unwanted image to the central zone, and so on. In order to minimize power transfer to the unwanted image $B_1$ the transition must minimize mode conversion to the corresponding unwanted mode $\Psi_1$, and similarly for the other unwanted images. The most important unwanted mode, causing the largest loss, is $\Psi_1$. This is the mode with the closest propagation constant to the fundamental mode $\Psi_0$. For this reason $\Psi_1$ is typically responsible for most of the loss. In general, the properties of a transition are primarily determined by the transition length in the region 462 where the waveguides are substantially coupled. If this region is very gradual, then the array will approximately produce a rectangular pattern, and its loss in the vicinity of the central zone boundaries ($P_1, P_2$ in FIGS. 4, 3B) will be primarily caused by mode conversion from $\Psi_0$ to $\Psi_1$. On the other hand, it is often desirable to use a relatively short transition. Then the transition design may have to be modified as shown later.

As pointed out earlier, prior art waveguide arrays exhibit substantial loss caused by the mode $\Psi_1$ responsible for the unwanted image $B_1$. The present invention substantially reduces this particular image. To this purpose, I design the array so that its final section in the vicinity of the output circle 463 in FIG. 4 is essentially periodic with angular period $\alpha/2$ equal to one half the angular period $\alpha$ of the array. Each input waveguide is connected to a pair of waveguides forming, at the junction 463 with the slab, a periodic arrangement of apertures with angular period $\alpha/2$. As shown in FIG. 4 the new arrangement consists, in its simplest form, of an array of Y-branches 460 connected to a transition region 494 where the initial period $\alpha$ gradually changes to $\alpha/2$. I first describe the array design when the transition region between the Y-branches and the output circle is very gradual, and there is negligible coupling between the Y-branches (this requires their distance from the output circle to be large enough, so that their separation is large enough). The transition can then be divided into two sections, namely an input section 461 connected to the Y-branches and characterized by negligible coupling between adjacent elements, followed by an output section 462 characterized instead by strong mutual coupling over most of its length. The Y-branches, since they are essentially uncoupled, can be designed with negligible loss by well-known techniques. Once this condition is realized, mode conversion primarily takes place in the second section 462 where there is substantial mutual coupling. More precisely, it primarily occurs in the array region where the two modes $\Psi_0$ and $\Psi_1$ are close to synchronism (Dragone, C., "Optimum Design of a Planar Array of Tapered Waveguides," J. Opt. Soc. Amer. A., Vol. 7, No. 11, pp. 2081–2093, November 1990). Notice, a similar situation arises in a conventional array, in which case the loss is primarily caused in FIG. 2 by the end discontinuity 263 at the junction with the slab. Now, however, the loss caused in FIG. 4 by the end discontinuity is essentially eliminated, since the discontinuity is periodic with period $\alpha/2$. Indeed, since the transition region in the vicinity of the junction 463 is approximately periodic with period $\alpha/2$ there is little mode conversion from $\Psi_0$ to $\Psi_1$ in this entire region. In particular, since the parameter Q(z) gradually goes to zero, the end discontinuity 463 does not cause any mode conversion from $\Psi_0$ to $\Psi_1$. The final result is that the unwanted image $B_1$ is substantially eliminated. This result is simply obtained by using a gradual transition that is initially periodic with angular period $\alpha$, and it gradually becomes periodic with period $\alpha/2$.

Figure 3B:
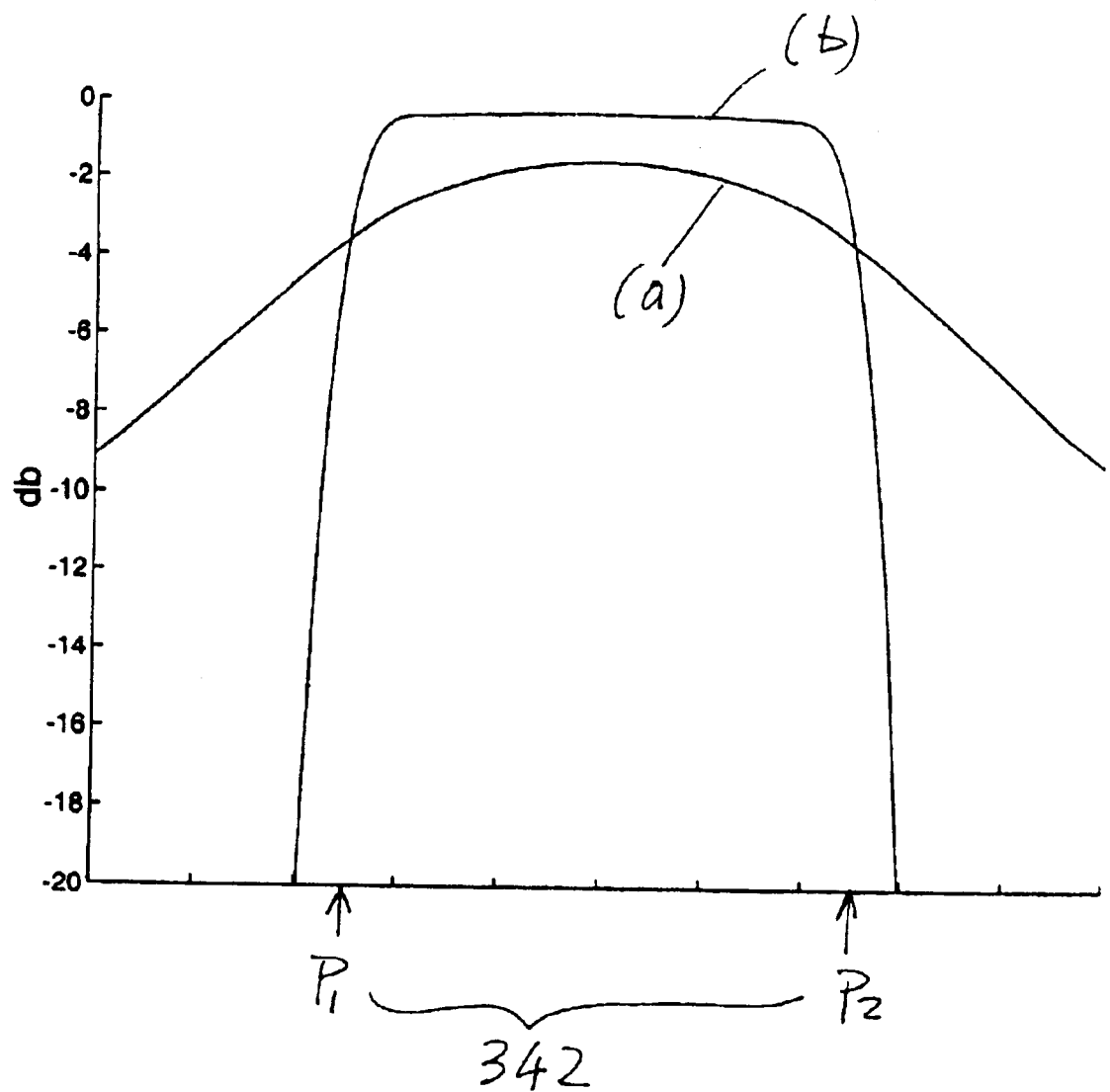
FIG. 3b compares the pattern (a) shown in FIG. 3a with a pattern (b) obtained by using the technique of FIG. 4.

FIG. 3B shows a comparison between the element pattern (a) of a conventional array and a pattern (b) produced by my technique. The two patterns were calculated assuming in both cases the same $\alpha(R)$ and the same gap values at the end of the array, for z=R. In both cases the transition length exceeds 4000 microns. However the technique of the present invention produced period $\alpha/2$ at the end of the array. It can be seen from FIG. 3B that the loss of a conventional array varies considerably in the central zone and its minimum value exceeds 1.5 dB. The loss in this case is primarily caused by the nonzero value of t(z) at the array junction 263 with the slab, and it is essentially eliminated by my technique. Notice the residual loss of curve (b) remains small over most of the central zone. Moreover, since the residual loss is approximately a constant, the element pattern is very nearly a rectangular function. This important property is obtained because the residual loss is primarily caused by excitation, at the array junction discontinuity 463, of the unwanted mode $\Psi_2$.

Figure 5A:
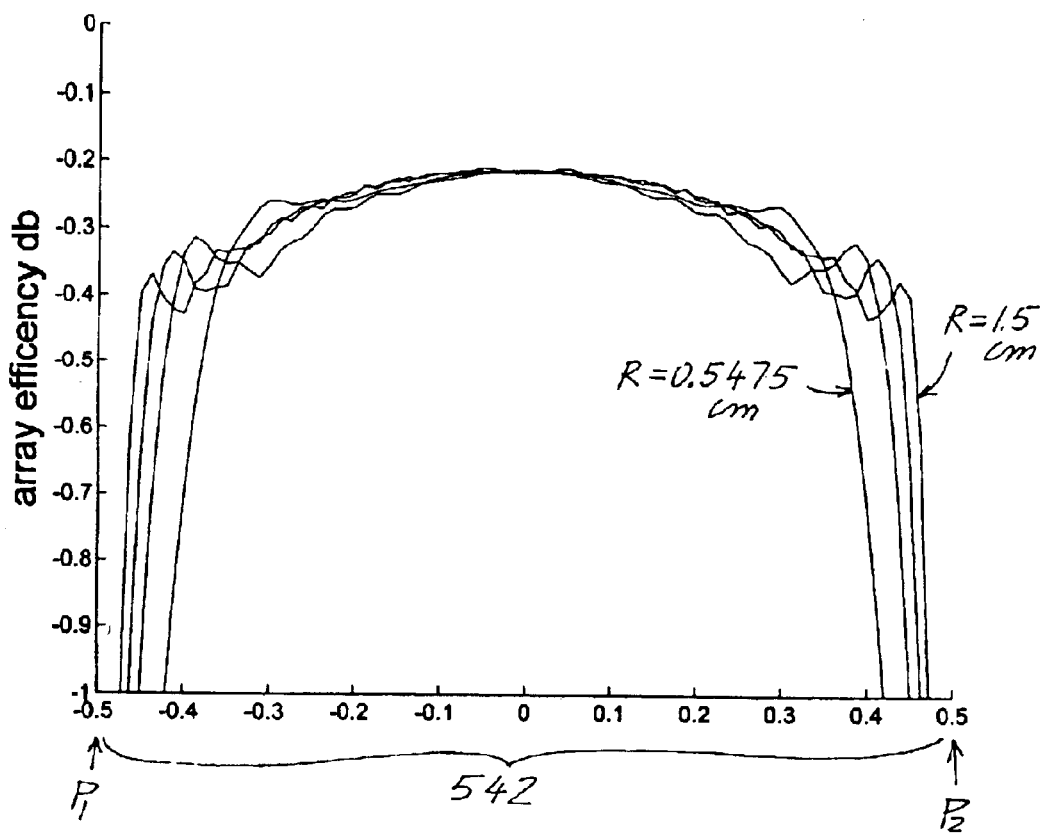
FIG. 5a shows four element patterns produced by the technique of FIG. 4 for different focal lengths R.
Figure 5B:
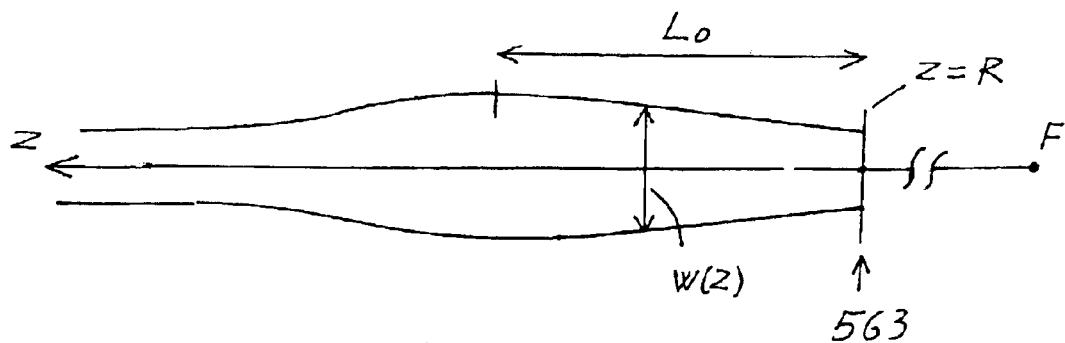
FIG. 5B shows the waveguide profile in the final section 462 of the transition.
Figure 6:
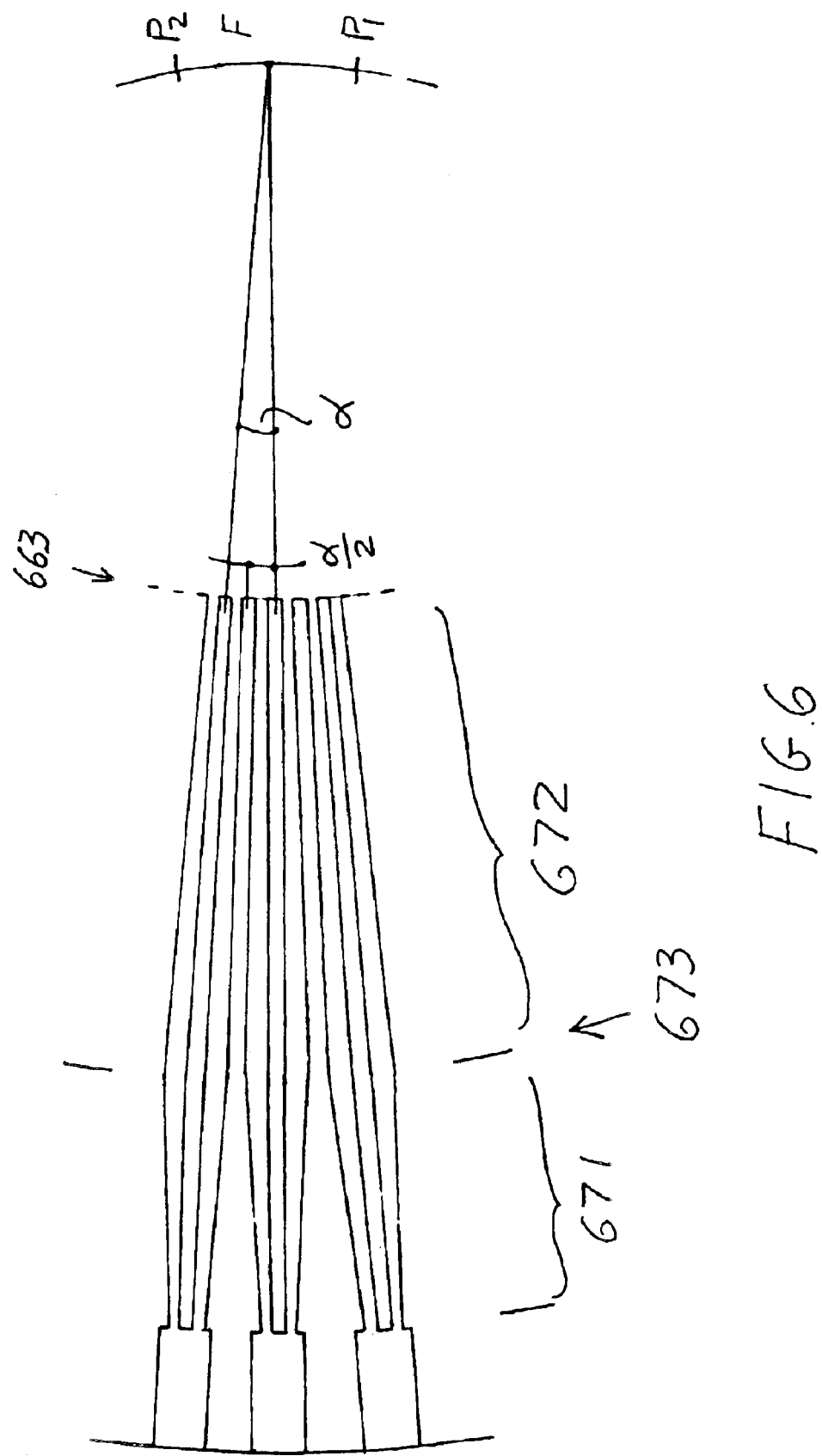
FIG. 6 shows a second embodiment of the present invention.

In practice, for many applications, one would like to maximize in the central zone the width $\Omega_0$ for which the loss to remains less than a specified value [U.S. Pat. No. 6,058,233 which issued on May 2, 2000]. However, it is also important to reduce the transition length, since a long transition requires a long focal length R and it is difficult to realize. Then, by reducing the transition length, the width $\Omega_0$ is correspondingly reduced. FIG. 5a shows typical results, calculated respectively for $$R=0.5475, 0.750, 1.125, 1.50 \text{ cm} \quad (4)$$

by assuming a contrast $\Delta n/n=0.0055$ and a period $\alpha 15$ microns at the array junction with the slab. In each case the gap $t_0$ between the two guiding strips of each period was kept equal to 3 microns in the entire transition. However, for the other gap, the optimum variation $t_1(z)$ was a monotonic decrease, from a large initial value at the input 460 of the transition to a final value of 3 microns. In all cases, after optimizing the transition, the optimized width w(z) of the two waveguides in each period was found to have an intermediate maximum, produced between the input and output circles of the transition. The waveguides profile is shown in FIG. 5B. In all cases the initial and final widths were equal to 4.5 microns and the maximum value of w(z) varied between 5.2 and 5.6 microns. A second embodiment of the present invention, shown in FIG. 6, is discussed later.

In FIG. 4, the critical region, which is responsible for most of the array loss, is the region 462 characterized by appreciable coupling between the waveguides of adjacent periods. Important parameters of this region are its length L and the initial and final values $\alpha(R+L)$ and $\alpha(R)$ of the element spacing $\alpha(z)=\alpha z$ determined by the angular period multiplied by the radial distance z from F. For a given focal length R, the angular spacing $\alpha=\alpha(R)/R$ is determined by $\alpha(R)$, and the total length is determined by $L=R[\alpha(R+L)-\alpha(R)]/\alpha(R)$, showing that a along transition length generally requires a long focal length R, for given values of $\alpha(R+L)$ and α(R). Notice, a relatively large value α(R+L) is required in order to insure negligible mutual coupling in the initial section 461 of the transition whereas, in the final section 462 of the transition, a small value of α(R) is required to minimize the loss. The value of α(R) is given by the sum $2w(z)+t_0(z)+t_1(z)$ for z=R where w(z) is the waveguide width. In order for the technique of FIG. 4 to be efficient, the waveguides must be strongly coupled in the vicinity of the array junction 463. Ideally, α(R) should be as small as reasonably feasible (as allowed by the fabrication process). In particular, the width of each waveguide should be appreciably smaller than the width for which each waveguide would be multimoding in the absence of the other waveguides. In all examples considered here $w(R), t_0(R)=$ 5.0, 3.0 microns, respectively, and $\Delta n/n=0.0055$.

In general, a periodic array cannot be efficient in the entire central zone interval [Dragone, C., "Optimum Design of a Planar Array of Tapered Waveguides," J. Opt. Soc. Amer. A., Vol. 7, No. 11, pp. 2081–2093, November 1990]. The array can only be efficient in a smaller interval $I_0$ of width $\Omega_0$ smaller than $\Omega$. In the transition of FIG. 4 the critical region, which is responsible (as pointed out earlier) for most of the loss in the vicinity of the edges of $I_0$, is the final region of length L characterized by substantial coupling between the waveguides of adjacent periods. In order to insure negligible mode conversion $\Psi_0 \rightarrow \Psi_1$, the length L of this region must produce between the two modes $\Psi_0, \Psi_1$ a phase shift exceeding $\pi$. Therefore L must approximately satisfy in the interval $I_0$ the condition $$L\Delta\beta > \pi \quad (5)$$

where $\Delta\beta$ is the difference in propagation constant between the two modes $\Psi_0, \Psi_1$. This condition can only be satisfied if L, which is determined by the focal length R, is long enough. Notice, for any principle image location B on the image circle, the corresponding value of $\Delta\beta$ is approximately proportional to the distance of B from the closest edge of the central zone. Therefore, if a short focal length (and therefore a small L) is required, then negligible loss can only be realized inside an interval $I_0$ of width $\Omega_0$ appreciably smaller than $\Omega$. In this case, it may be advantageous to reduce the distance of the Y-branch from the array junction 463 by removing in FIG. 4 section 461, thus causing substantial mutual coupling between adjacent Y-branches as discussed next.

Figure 7:
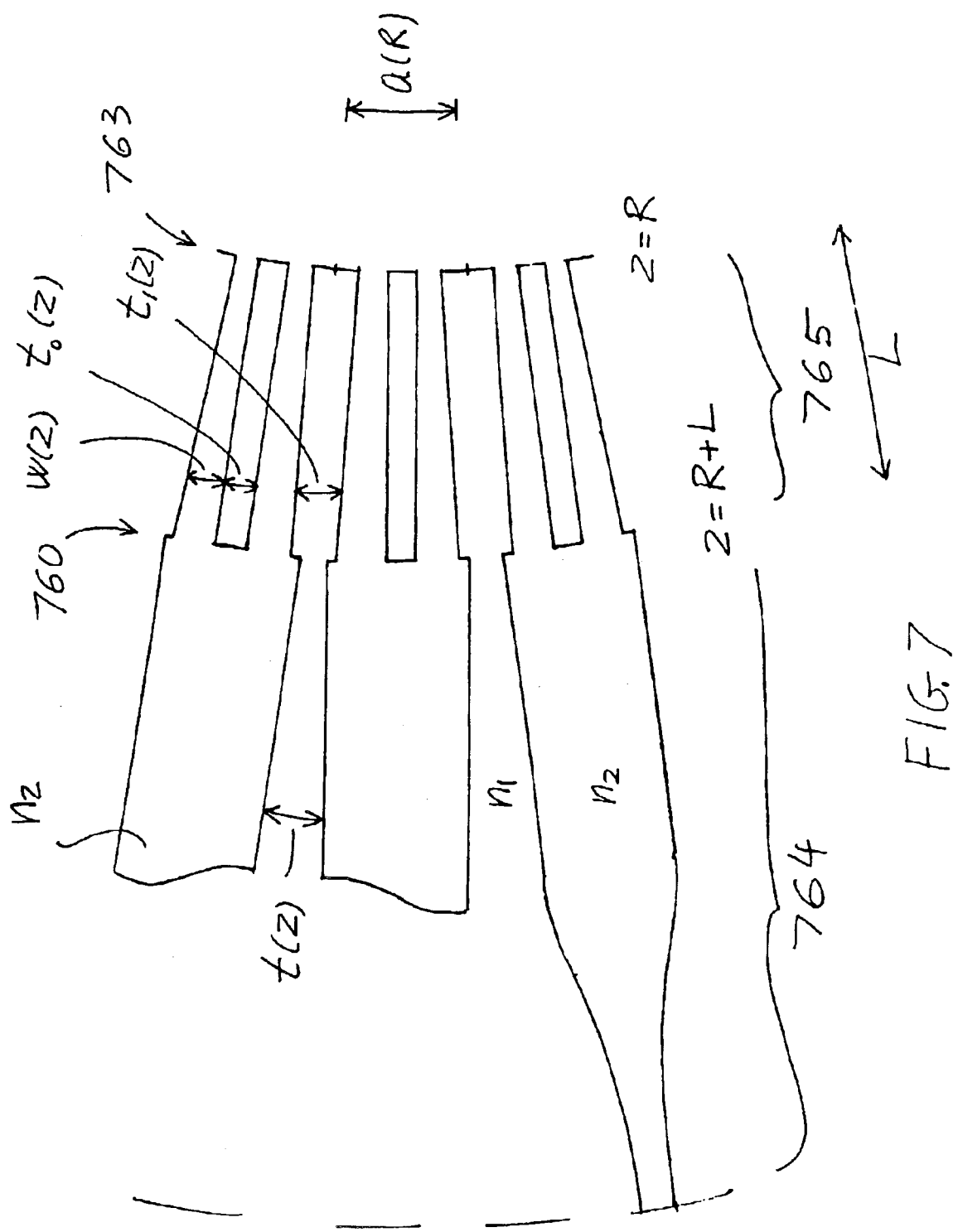
FIG. 7 shows the arrangement of FIG. 4 in the special case where the Y-branches 760 are close to the array junction 763 with the dielectric slab.

For applications requiring a relatively short focal length, it may be advantageous to modify the arrangement of FIG. 4 by including suitable discontinuities, each producing an abrupt variation of $t_0, t_1$ on a circle centered at the focal point F. Then, by properly choosing the discontinuities and their separations, it is possible to minimize mode conversion from $\Psi_0$ to $\Psi_1$ in the vicinity of one or more locations of central zone. The simplest example of this technique involves two discontinuities, whose radial separation L must be properly chosen so as to cause their contributions to $\Psi_1$ to approximately cancel each other. An example is shown in FIG. 7. One discontinuity 760 is produced at the junction with the Y-branches and, the other, is produced at the junction 763 with the slab, as discussed next. Notice the new arrangement differs from that of FIG. 4 in two respects. First, the distance of the Y-branches from the end circle 763 is substantially reduced, and therefore now the Y-branches are strongly coupled. Second, now Q(z) varies discontinuously for z=R.

The array of FIG. 7 can be viewed as a combination of two transitions 764 and 765. The first transition is a conventional transition in which each period α only includes one waveguide. The second transition includes two waveguides in each period. The arrangement is characterized by two discontinuities 760 and 763, respectively produced at the end of each transition. Notice the first transition is characterized by a gradual variation of the gap value t, from an initial input value to a much smaller value produced at the junction 760 with the second transition. In the second transition, a nonzero value of $t = t_1 - t_0$ must be chosen at the end of the transition. This nonzero $t_1 - t_0$ is required, at the array junction 763 with the slab, in order to reduce the loss that would otherwise be caused by the first discontinuity 760. In the vicinity of either edge of the interval $I_0$ this loss is primarily caused by $\Psi_1$. Therefore the two discontinuities must be properly chosen so that their contributions to $\Psi_1$ approximately cancel each other. To this purpose, the contributions to $\Psi_1$ from the two discontinuities must have approximately the same magnitude and their separation L must produce (approximately) a relative phase shift of $\pi$ between said contributions. This requires the condition $\Delta\beta L \approx \pi$ where $\Delta\beta$ is the difference in propagation constant between $\Psi_0$ and $\Psi_1$. Notice this condition must be satisfied in the vicinity of a particular location B for which the loss must be minimized. This location (inside the central zone 442 of the focal circle 441) can be chosen on either side of the focal point F. Then, by symmetry, the loss will also be minimized at the symmetric location on the other side of F. Therefore, in general, E(B) will have two maxima separated by a minimum at the focal point. More generally, instead of using only two discontinuities, there may be included several discontinuities and the optimization will then proceed along similar lines, by insuring that the various contributions to $\Psi_1$ approximately cancel each other. Notice, by this technique, several maxima separated by several minima can be produced in the array element pattern.

Notice, once the transition is so optimized, it becomes effectively equivalent in the vicinity of the above maxima to a transition with end period $\alpha/2$, since it is characterized by negligible excitation of $\Psi_1$. A distinctive feature of this technique is that it will produce outside the central zone several minima, each corresponding to one of the above maxima. These minima will be produced by the secondary image $B_1$ in two intervals of width $\Omega/2$ adjacent to the central zone, and it can be observed by connecting suitable waveguides to the focal circle in these intervals.

In the examples shown in FIG. 5a, the central gap $t_0$ between each pair of waveguides was kept constant, in which case the specified period $\alpha/2$ is only realized at the end of the array. Alternatively, it may be desirable to include at the end of the array a finite section of period $\alpha/2$ as shown in FIG. 6. The array may then consist in general of a first section 671 in which the central gap is initially increased, followed by a section 672 with period $\alpha/2$, in which the gaps are gradually reduced to their final value as shown in FIG. 6. In this case, an important property is that the entire section of period $\alpha/2$ does not excite the first unwanted mode (the one contributing to the first secondary image $B_1$). As an application, it is possible, by using the arrangement of FIG. 6, to essentially realize unity efficiency in the immediate vicinity of the focal point F by using a short transition. In this case, since there is no coupling between the two modes $\Psi_0$ and $\Psi_1$ in the entire section 672, this section can be very short. Then by properly designing the arrangement so that there in negligible coupling between adjacent periods in section 671, nearly unity efficiency is obtained in the vicinity of the focal point. The above arrangement is particularly suitable when the focal length is very short.

Figure 8:
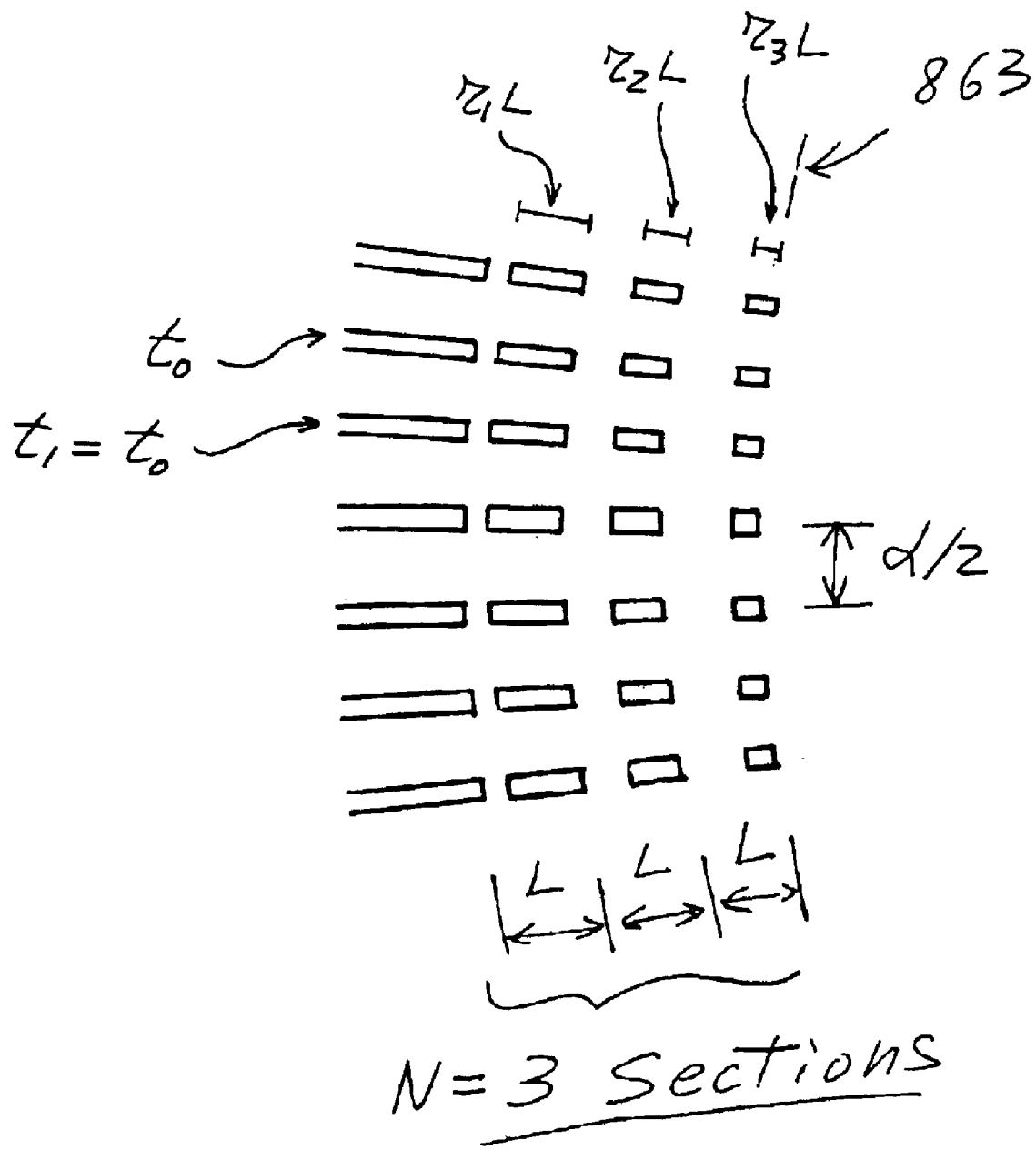
FIG. 8 shows a segmented arrangement of period $\alpha/2$ in the vicinity of the array junction 863 with the slab.
Figure 9:
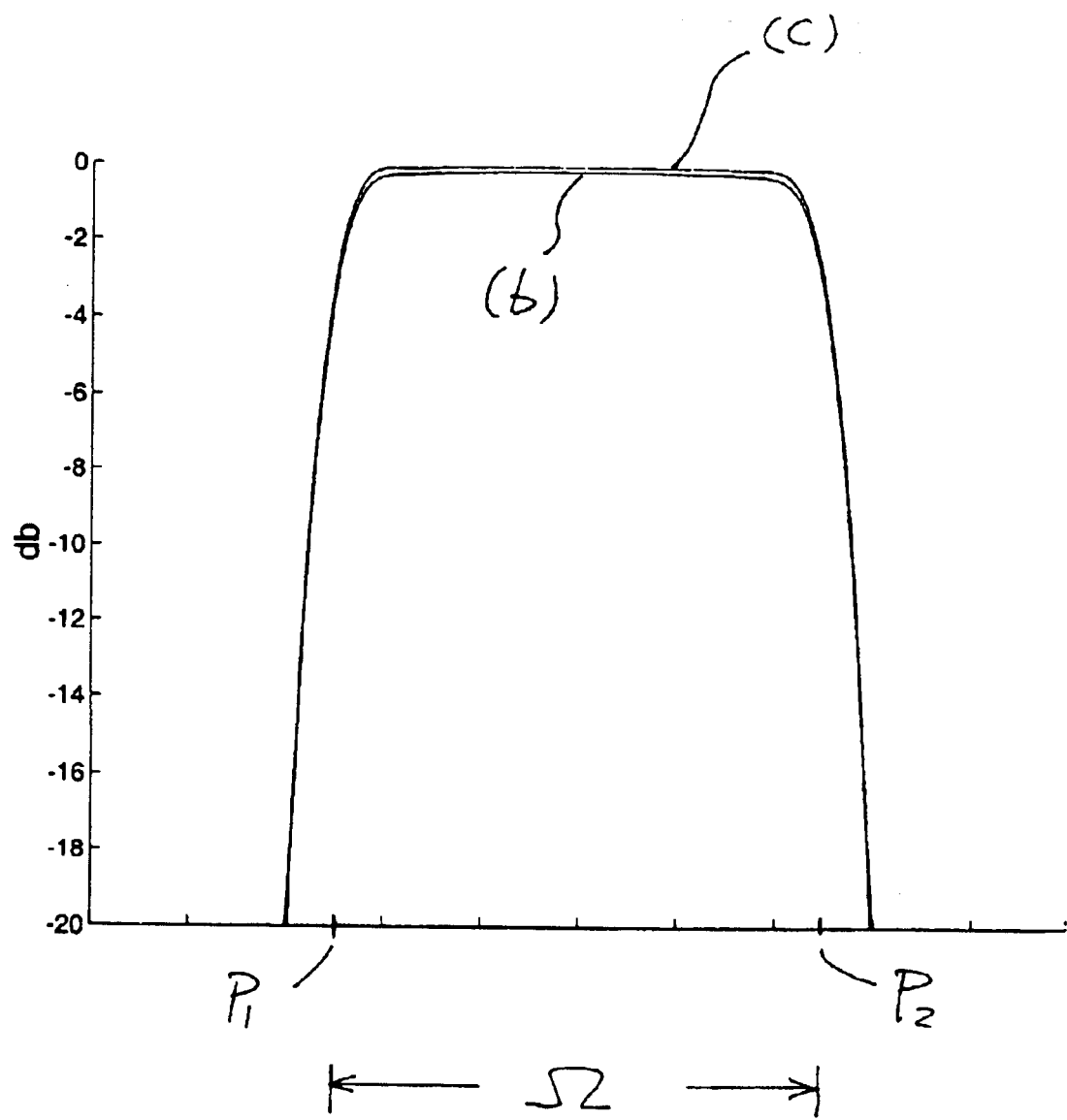
FIG. 9 shows the array element pattern (b) of FIG. 3B compared with the improved pattern (c) obtained by a segmented arrangement of 3 sections as in FIG. 8.

By using a gradual transition 462, we have seen that the array loss is small, and it is approximately a constant in the central region of the element pattern. This residual loss is primarily caused by the unwanted mode $\Psi_2$, and it is primarily contributed by the end discontinuity at the array junction 463. A property of $\Psi_2$ is that its propagation constant is appreciably different from that of $\Psi_0$. As a consequence the above loss can be substantially reduced by properly segmenting the array region close to the slab. Since the end of the transition 462 is periodic with period $\alpha/2$, the segmented region should also be periodic with the same period $\alpha/2$ as shown in FIG. 8. In the segmented region each gap, instead of being continuous, is segmented as in U.S. Pat. No. 5,745,618 which issued on Apr. 28, 1998. The segmented region consists of N=3 sections, of approximately the same radial length L. The gap in the i-th section only occupies a fraction $r_i$ of the length L, and the value of $r_i$ decreases as the index "i" becomes closer to the end 863 of the array. Here each section is assumed to be relatively short, and therefore each gap of length $r_iL$ is approximately equivalent to a gap of the same area, but occupying the full length L. In other words each gap of thickness $t_0$ (note here $t_0=t_1$) and length $r_iL$ is approximately equivalent to a gap of smaller thickness $r_it_0$ occupying the full length L. The arrangement is therefore approximately equivalent to a transition in which each gap decreases in a step-wise fashion. Since the arrangement is periodic with period $\alpha/2$, here segmentation reduces the unwanted mode $\Psi_2$ without causing $\Psi_0 \rightarrow \Psi_1$. Therefore the technique of the present invention differs from the array segmentation of U.S. Pat. No. 5,745,618. In the latter case segmentation, when applied to a conventional array, requires a large number N of segments in order to substantially reduce $\Psi_0 \rightarrow \Psi_1$ so as to realize element patterns similar to those obtained here. Such large N would not be generally feasible, because of unwanted resonances resulting in substantial generation of higher order modes. However by using the technique of the present invention, a relatively small number N, typically between 3 and 6, is sufficient to substantially reduce the residual loss caused by $\Psi_2$. For instance, by only using 3 sections, the loss of curve (b) in FIG. 3b is reduced as shown in FIG. 9.

Figure 10:
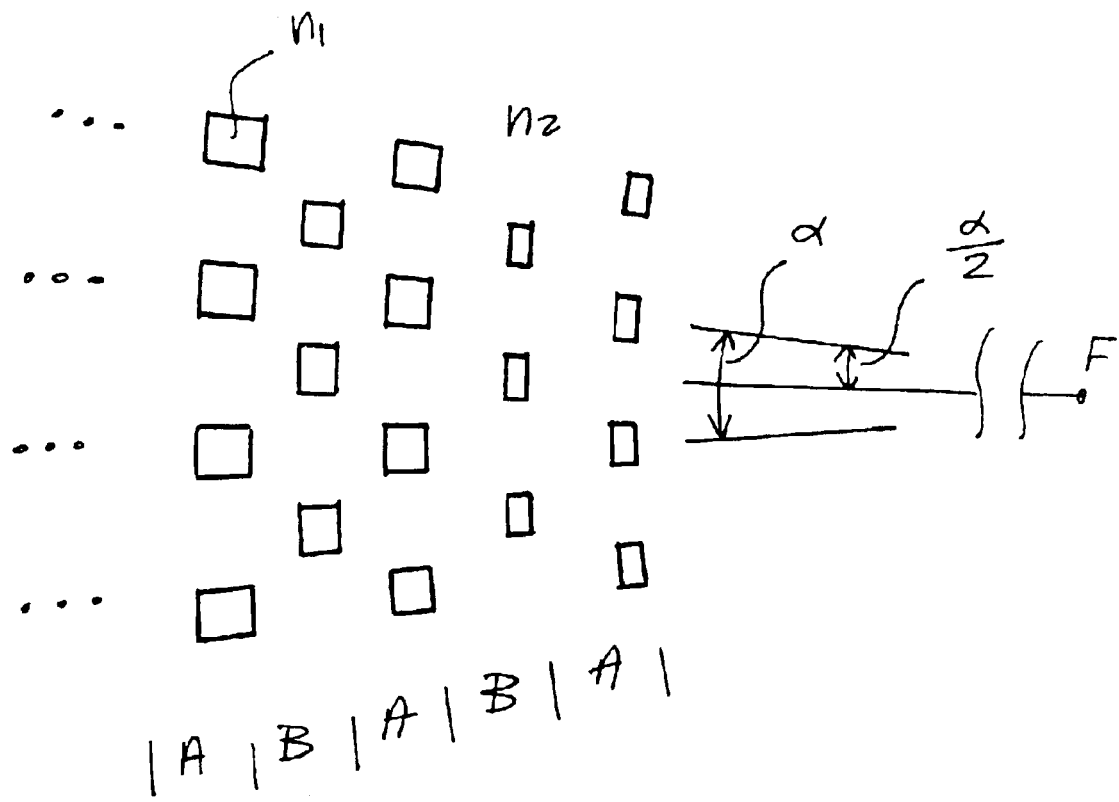
FIG. 10 shows a segmented region where each segment is periodic with angular period $\alpha$, and adjacent segments A, B are rotated with respect to each other by $\alpha/2$, so that their combination is approximately equivalent to a section of period $\alpha/2$; and, FIG. 11 shows an array in which the loss of each Y-branch is minimized by segmenting the gap between the two waveguides.
Figure 11:
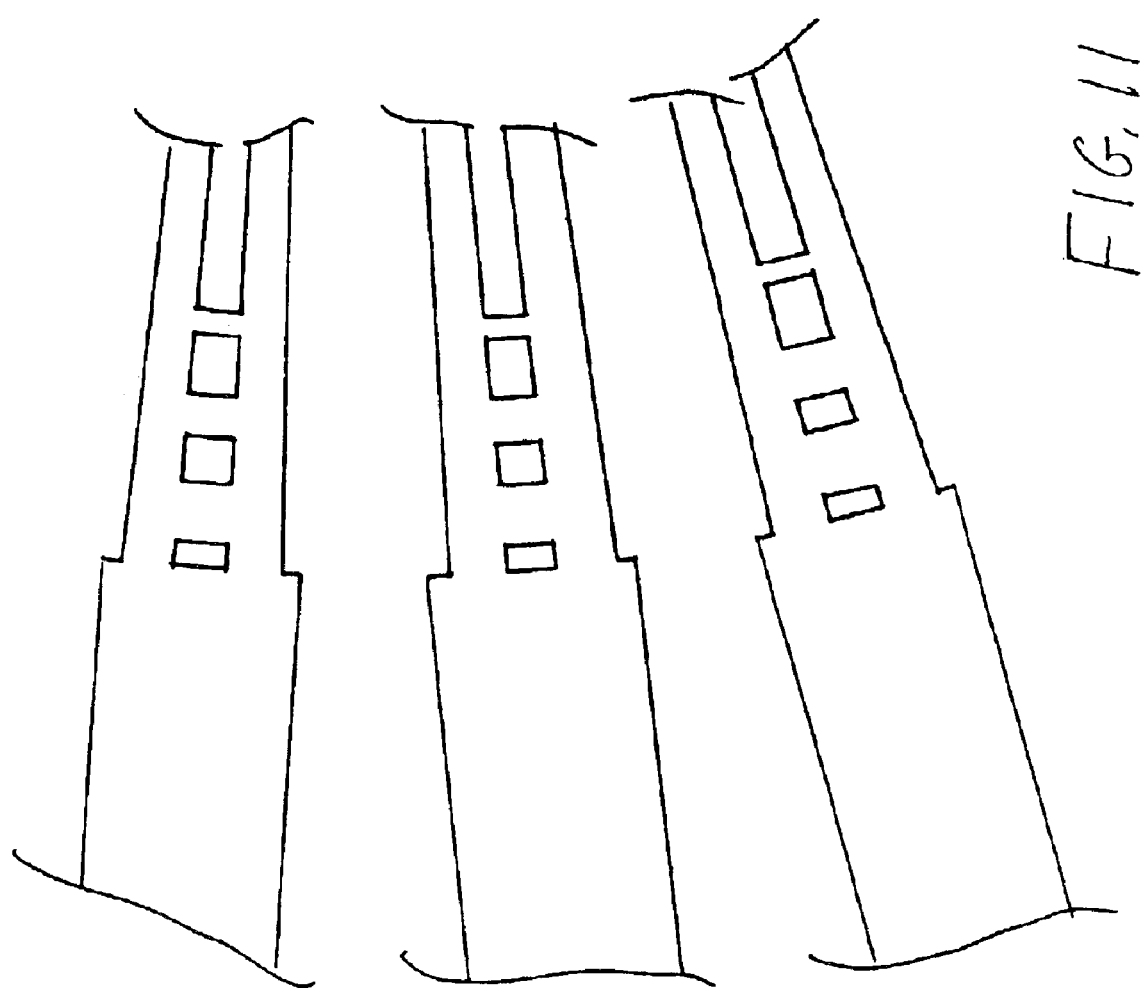
Figure 2:
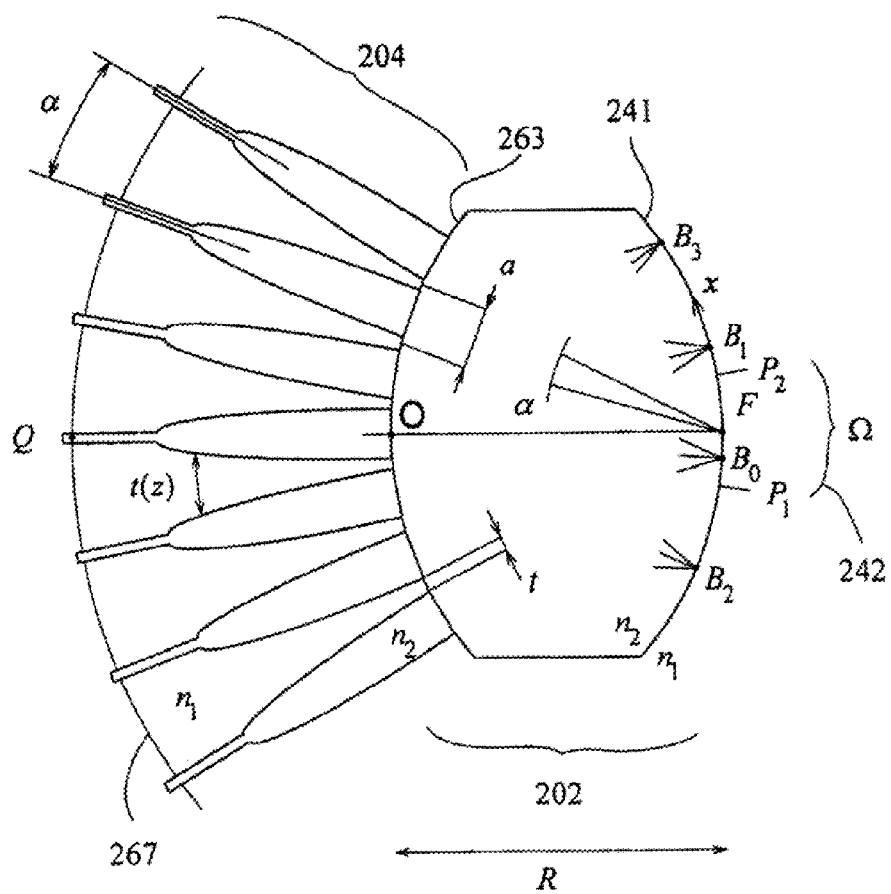
Figure 3A:
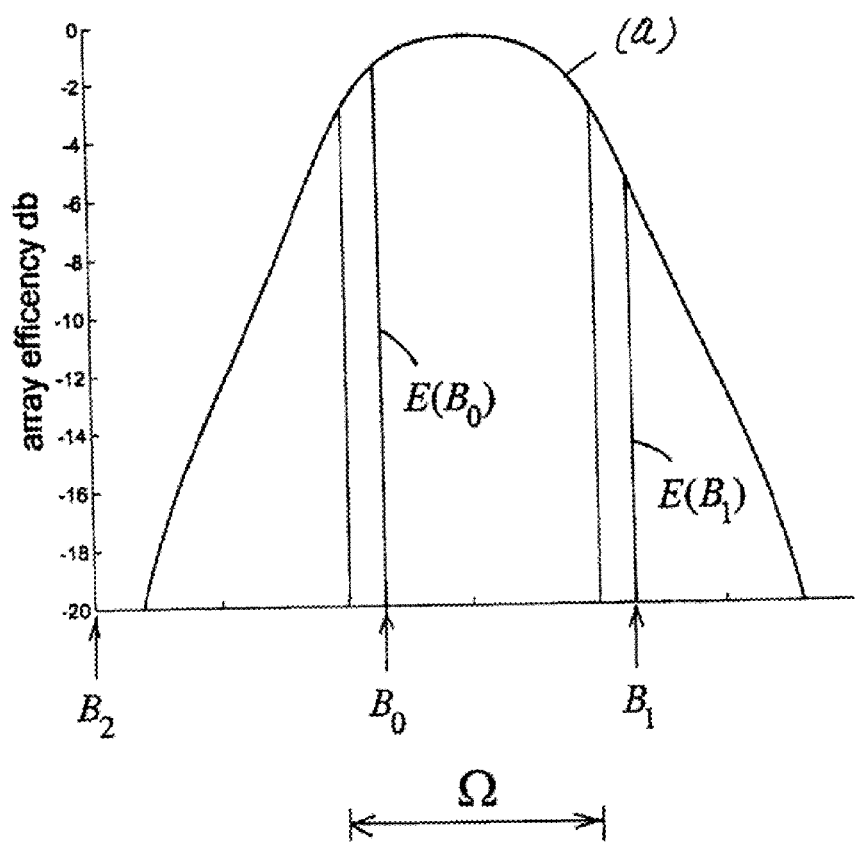
Figure 3B:
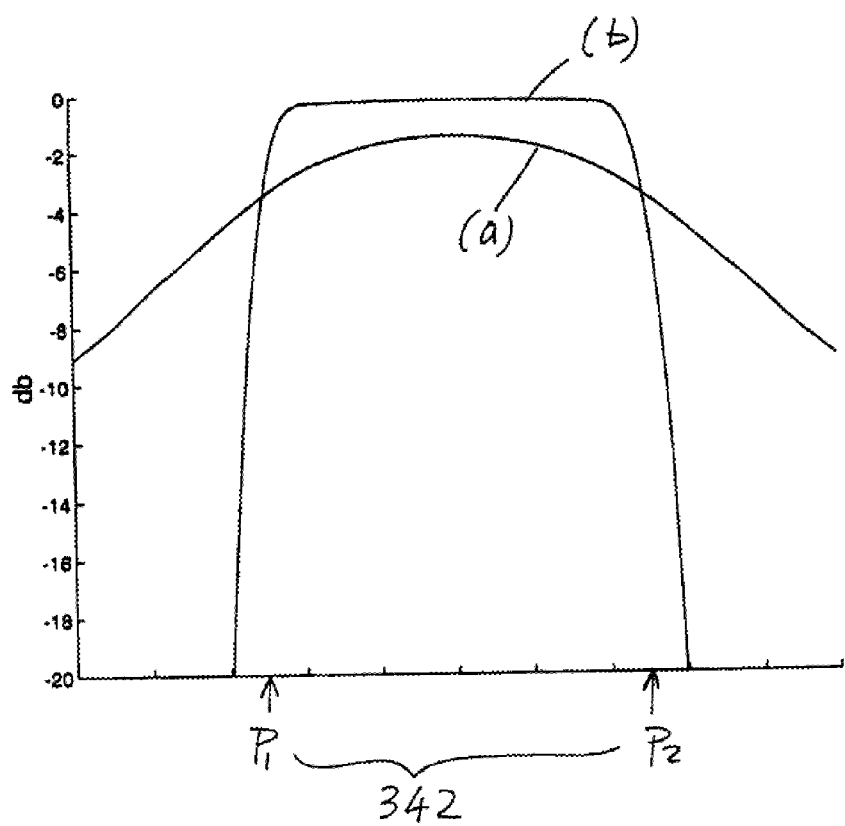
Figure 4:
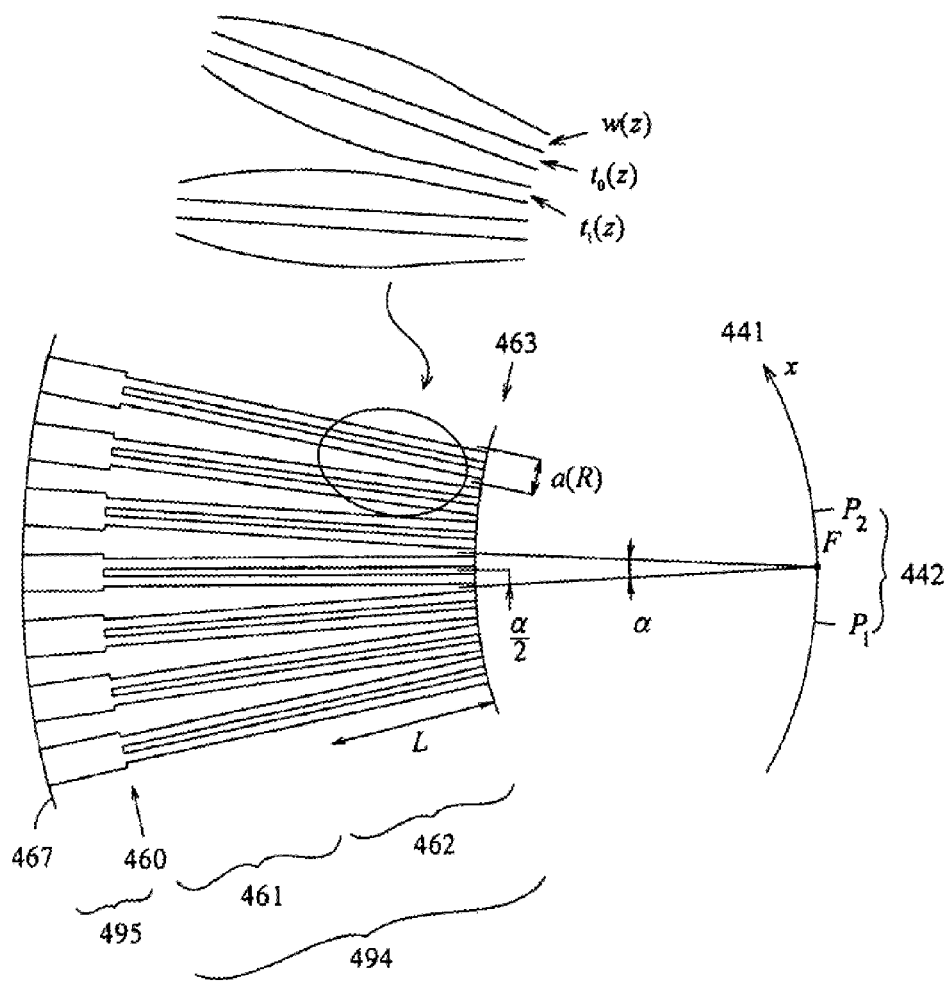
Figure 5A:
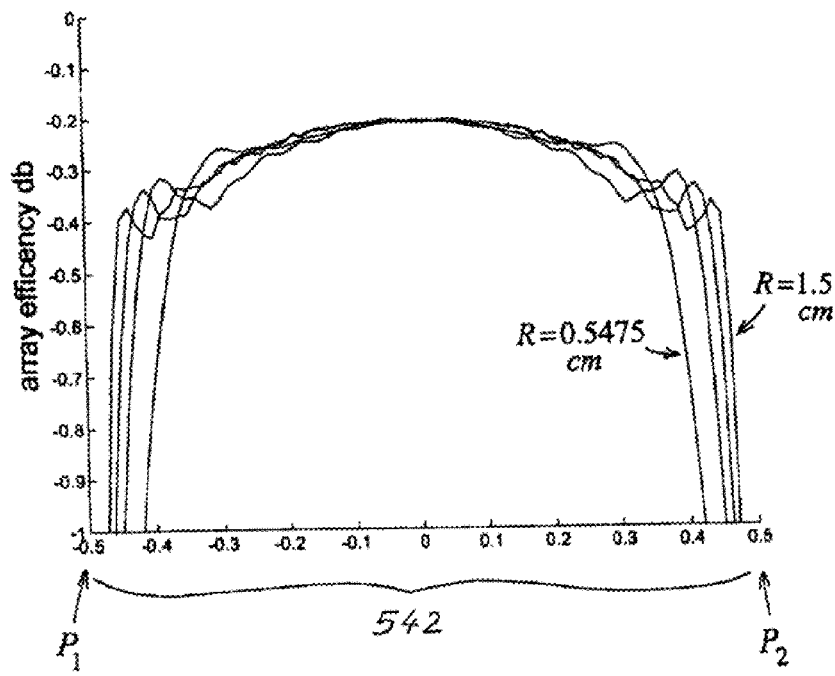
Figure 5B:
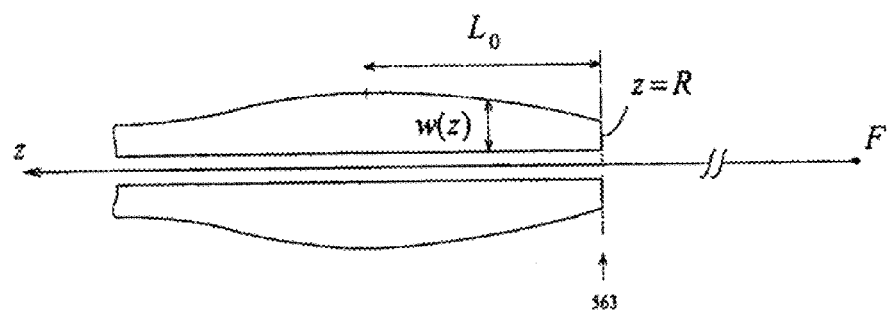
Figure 6:
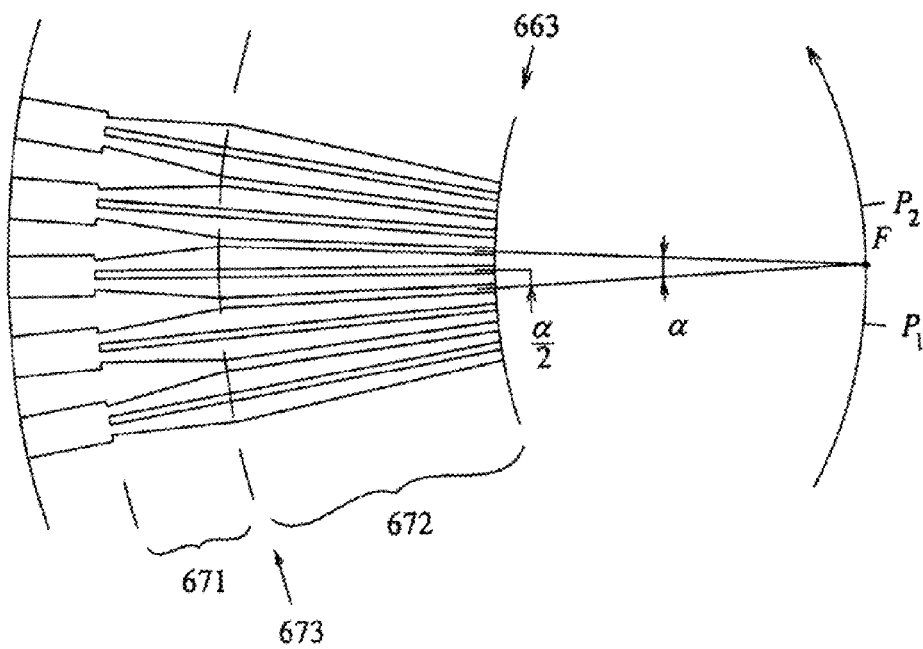
Figure 7:
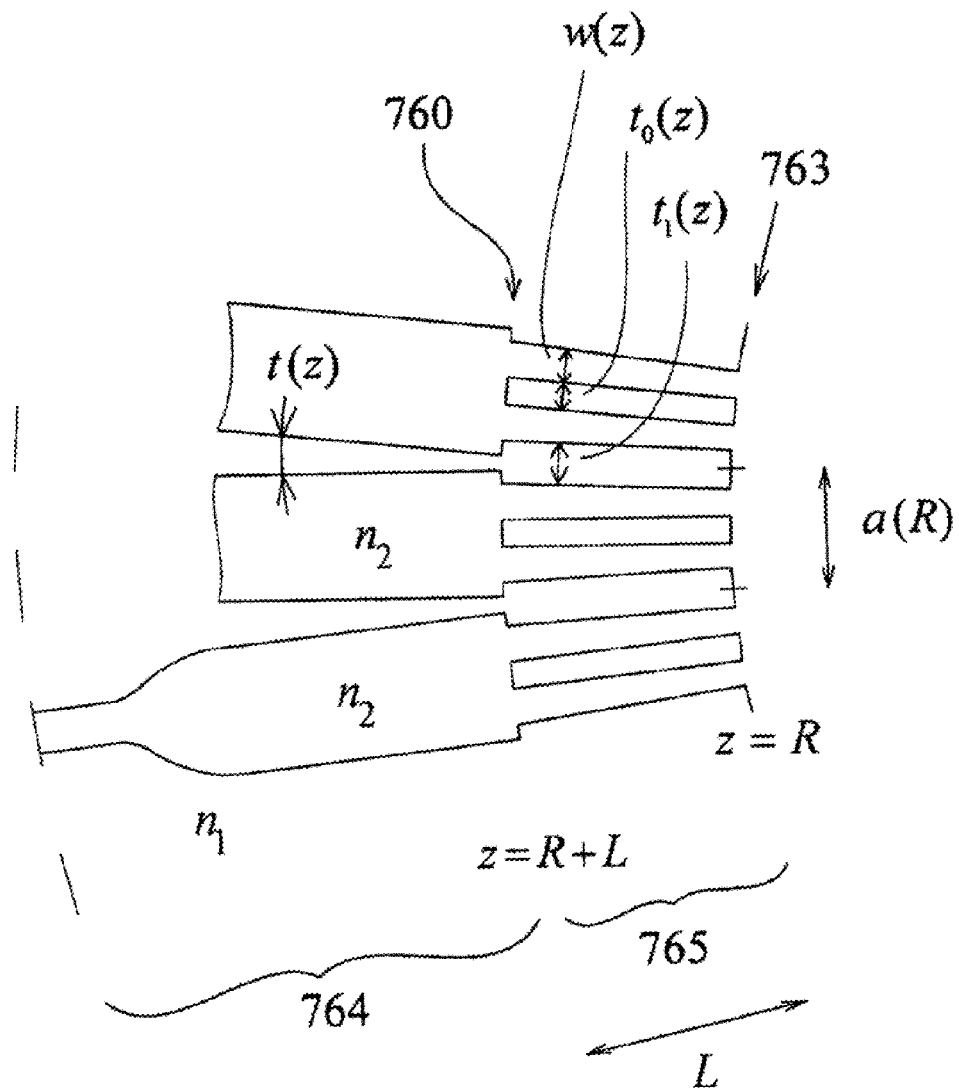
Figure 8:
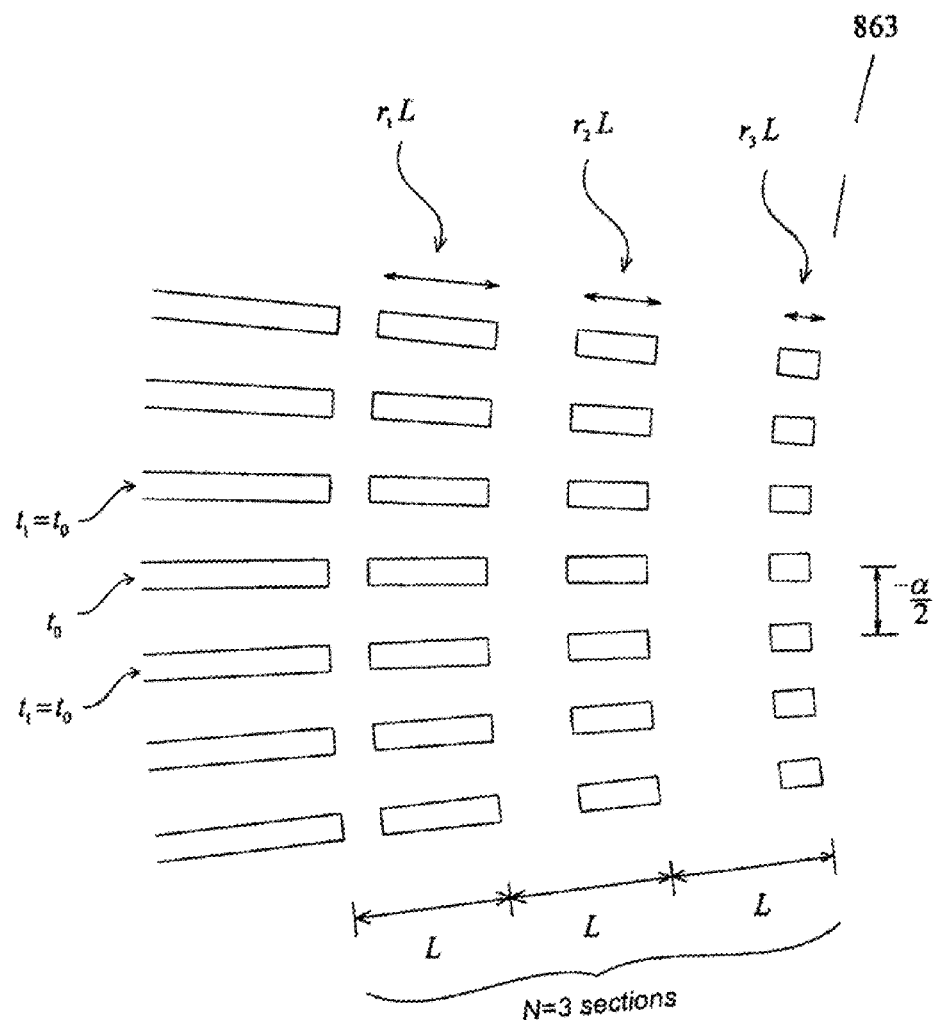
Figure 9:
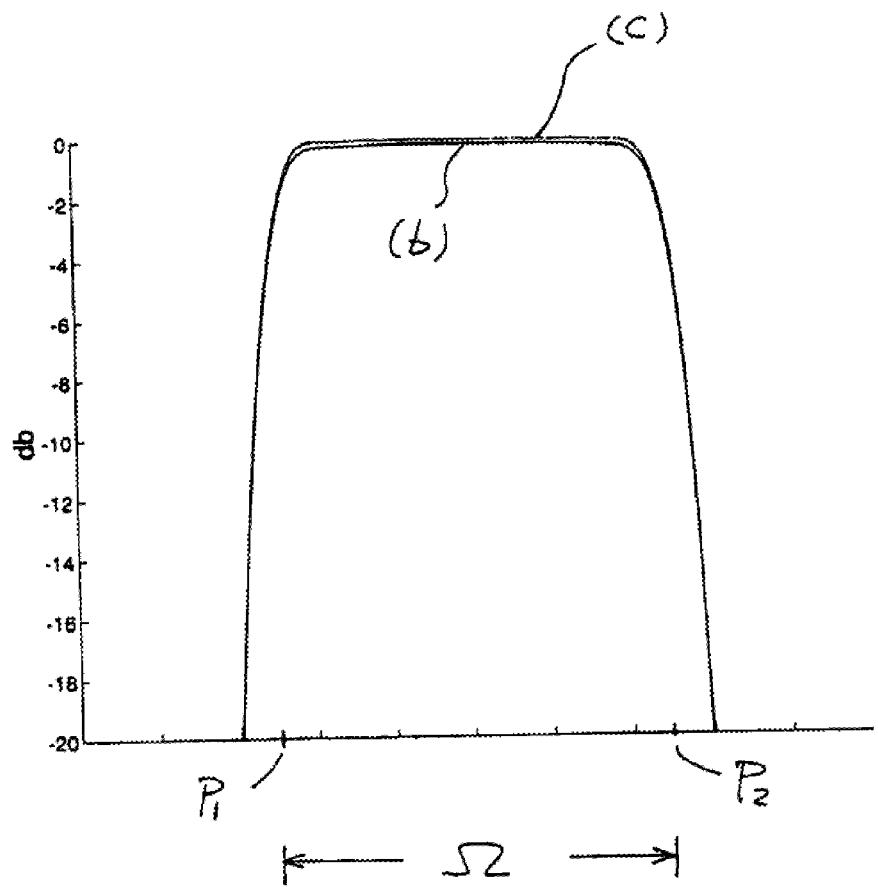
Figure 10:
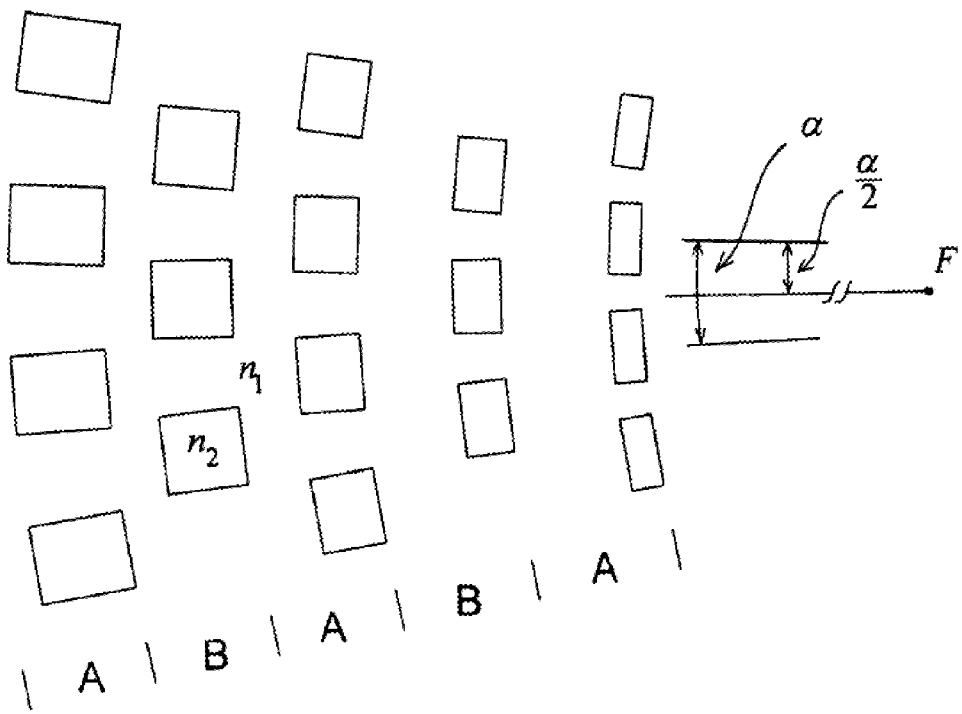
Figure 11:
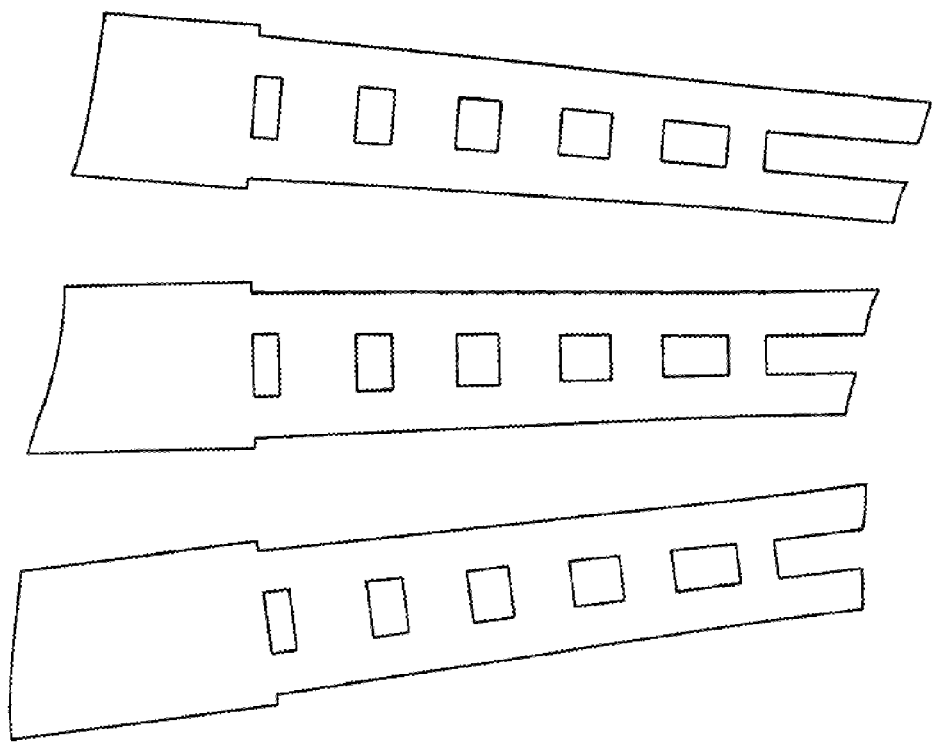

Notice, in some cases the width of each array element (occupying a period) may not be large enough (in the array region close to the junction 463) to accommodate two waveguides. It may then be advantageous to use the technique shown in FIG. 10. This arrangement is an alternating sequence of segments A and B. Each segment is periodic with angular period $\alpha$, and it contains one gap in each period. Each segment A is rotated by $\alpha/2$ with respect to the following segment B. If the length of each section is small enough, each pair of consecutive segments is approximately equivalent to a single section with period $\alpha/2$. Finally, notice that each Y-branch can be segmented as shown in FIG. 11.

A remarkable property of the transition of FIG. 4 is that it is possible, in any particular region of the transition, to properly choose the ratio $t_1(z)/t_0(z)$ along the transition so as to cause in that region negligible mode conversion $\Psi_0 \rightarrow \Psi_1$. The simplest example is the transition 672, which is simply characterized by $t_0(z)/t_1(z)=1$. More generally, for any given value specified for the above ratio at either end of a gradual transition, one can accurately realize the above property in the entire transition by properly choosing the above ratio (which then becomes a function of $\alpha(z)$) inside of the transition. An important feature of such transition is that it can be very short, with a strong variation of $t_1(z), t_0(z)$, without causing $\Psi_0 \rightarrow \Psi_1$. Therefore such transition can be useful to substantially reduce mutual coupling between the waveguides without substantially causing $\Psi_0 \rightarrow \Psi_1$. For instance, one can let section 462 consist of two subsections, namely an input subsection, connected to section 461, and an output subsection, connected to the junction 463 and characterized by strong mutual coupling. The purpose of the input subsection is to substantially reduce mutual coupling, and its length can be very short provided the ratio $t_1(z)/t_0(z)$ is properly chosen, so as to insure negligible conversion $\Psi_0 \rightarrow \Psi_1$. Notice, by letting the length of the output subsection go to zero, we obtain the arrangement of FIG. 6. The above technique can be useful, for instance, if the width $\Omega_0$ of the interval $I_0$ is much smaller than $\Omega$, in which case the output subsection can be relatively short and, therefore, the above arrangement can be realized with a short focal length, as previously stated for FIG. 6.

In view of the foregoing description, numerous modifications and alternative embodiments of the invention will be apparent to those skilled in the art. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

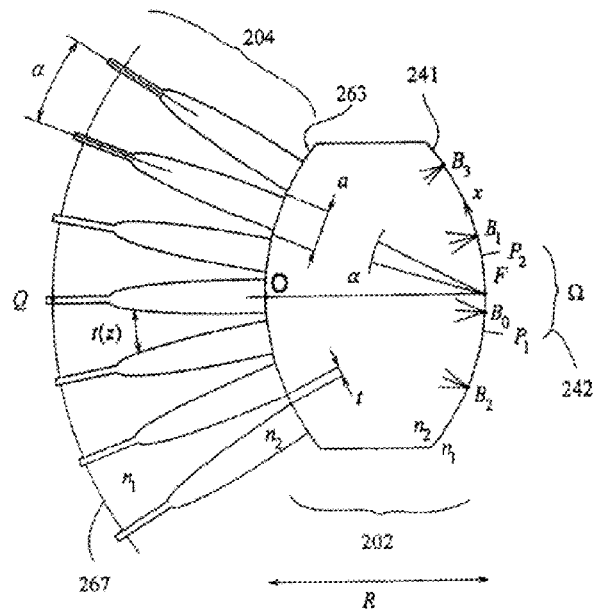

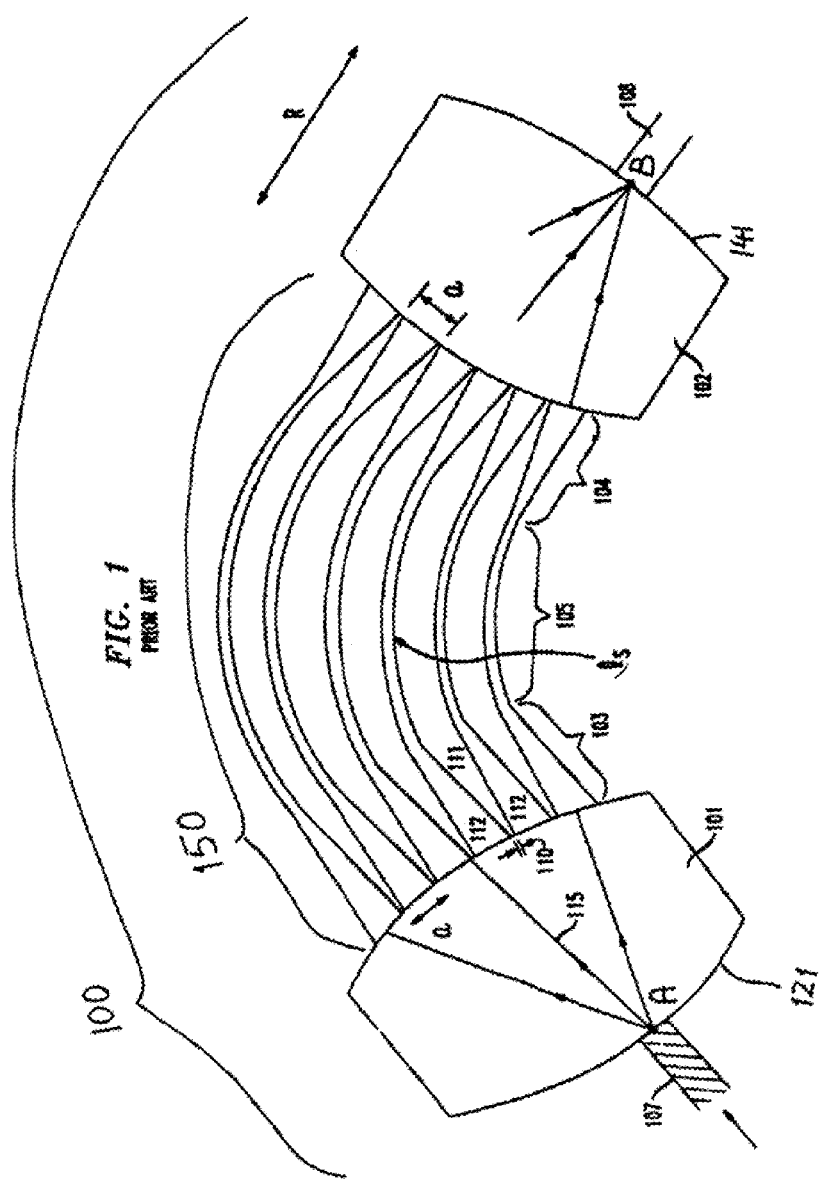

What is claimed is:

1. An optical interconnection device comprising:
   periodic array of radial elements forming a planar arrangement with virtual focal point F and period of angular width $\alpha$, wherein the array is formed between an input circle and an output circle that are both centered at F and the array consists of several circular sections centered at F;
   a first section directly connected to the input circle which includes in each period $\alpha$ a single strip waveguide of a refractive index higher than a refractive index on either side of the waveguide; and,
   a second section which includes in each period $\alpha$ a pair of substantially identical strip waveguides separated by a finite central gap of lower refractive index, wherein the second section approaches period $\alpha/2$ as the radial distance from the output circle decreases along the second section.

2. The optical interconnection device as recited in claim 1 wherein each pair of waveguides in each period of the second section is characterized, at any particular radial distance from the output circle, by a central gap that does not exceed the lateral gap separating either waveguide from the adjacent waveguide located in a different array period, and the lateral gap decreases as the radial distance decreases and the smallest value of the lateral gap is less than twice the smallest value of the central gap.

3. The optical interconnection device as recited in claim 1 wherein the smallest circle of the second section is characterized by period $\alpha/2$.

4. The optical interconnection device as recited in claim 1 wherein the width variation of each waveguide in the second section as a function of the radial distance from the output circle is characterized by an initial increase followed by a maximum value followed by a decrease in value.

5. The optical interconnection device as recited in claim 1 wherein the second section is directly connected to the output circle and the entire array consists of two sections joined together so as to form at their junction an array of Y-branches.

6. The optical interconnection device as recited in claim 1 wherein the waveguides form on the output circle a periodic arrangement with period $\alpha/2$.

7. The optical interconnection device as recited in claim 1 wherein the distance of the Y-branches from the output circle is chosen large enough to insure that negligible loss is caused by mutual coupling between the Y-branches.

8. The optical interconnection device as recited in claim 1 wherein the distance of the Y-branches from the output circle is chosen small enough to cause appreciable mutual coupling between the Y-branches and the resulting loss caused by mutual coupling between the Y-branches is reduced by properly choosing the radial distance of the Y-branches from the output circle, and by also allowing the gaps between adjacent waveguides on the output circle to deviate by suitable amounts from the values required to produce period $\alpha/2$.

9. The optical interconnection device as recited in claim 8 wherein the element pattern efficiency has two maxima in the central zone.

10. The optical interconnection device as recited in claim 1 wherein the array region adjacent to the output circle is segmented into a sequence of circular segments, wherein each segment consists of two circular sections, one of which contains two guiding strips in each period $\alpha$ and, the other section, is characterized by uniform index.

11. The optical interconnection device as recited in claim 1 wherein the second section includes a subsection whose ratio between lateral and central gaps is properly chosen along the radial length of the subsection so as to substantially eliminate mode conversion between the fundamental mode and the next higher order mode.

12. The optical interconnection device as recited in claim 1 wherein the second section includes a subsection whose ratio between lateral and central gaps is unity.

13. The optical interconnection device as recited in claim 1 wherein the array region adjacent to the output circle is segmented into an alternating sequence of circular segments of two different types A and B, wherein each segment of either type consists of two circular sections, one of which contains one guiding strip in each period $\alpha$ and, the other section, is characterized by uniform index, and the guiding strips of each segment A are rotated by $\alpha/2$ with respect those of each segment B.

14. A system for optical interconnection of waveguide lenses, waveguide gratings, and star couplers comprising:

a periodic array of radial elements forming a planar arrangement with virtual focal point F and period of angular width $\alpha$, wherein the array is formed between an input circle and an output circle that are both centered at F and the array consists of several circular sections centered at F;

a first section directly connected to the input circle which includes in each period $\alpha$ a single strip waveguide of a refractive index higher than a refractive index on either side of the waveguide; and, a second section which includes in each period $\alpha$ a pair of substantially identical strip waveguides separated by a finite central gap of lower refractive index, wherein the second section approaches period $\alpha/2$ as the radial distance from the output circle decreases along the second section.

15. The system for optical interconnection as recited in claim 14 wherein each pair of waveguides in each period of the second section is characterized, at any particular radial distance from the output circle, by a central gap that does not exceed the lateral gap separating either waveguide from the adjacent waveguide located in a different array period, and the lateral gap decreases as the radial distance decreases and the smallest value of the lateral gap is less than twice the smallest value of the central gap.

16. The system for optical interconnection as recited in claim 14 wherein the smallest circle of the second section is characterized by period $\alpha/2$.

17. The system for optical interconnection as recited in claim 14 wherein the width variation of each waveguide in the second section as a function of the radial distance from the output circle is characterized by an initial increase followed by a maximum value followed by a decrease in value.

18. The system for optical interconnection as recited in claim 14 wherein the second section is directly connected to the output circle and the entire array consists of two sections joined together so as to form at their junction an array of Y-branches.

19. The system for optical interconnection as recited in claim 14 wherein the waveguides form on the output circle a periodic arrangement with period $\alpha/2$.

20. The system for optical interconnection as recited in claim 14 wherein the array region adjacent to the output circle is segmented into a sequence of circular segments, wherein each segment consists of two circular sections, one of which contains two guiding strips in each period $\alpha$ and, the other section, is characterized by uniform index.

* * * * *

UNITED STATES PATENT AND TRADEMARK OFFICE
CERTIFICATE OF CORRECTION

PATENT NO.          : 6,873,766 B2                                Page 1 of 14
APPLICATION NO. : 10/410845
DATED                  : March 29, 2005
INVENTOR(S)        : Dragone It is certified that error appears in the above-identified patent and that said Letters Patent is hereby corrected as shown below:

Delete Title page illustrating a figure, and substitute therefor, new Title page illustrating a figure. (attached)

Delete drawing sheets 1 - 12, and substitute therefor drawing sheets 1 - 12. (attached)

Signed and Sealed this

Twenty-eighth Day of October, 2008

JON W. DUDAS
*Director of the United States Patent and Trademark Office*

United States Patent
Dragone

(10) Patent No.: US 6,873,766 B2
(45) Date of Patent: Mar. 29, 2005

(54) EFFICIENT WAVEGUIDE ARRAYS WITH NEARLY PERFECT ELEMENT PATTERNS

(76) Inventor: Corrado P. Dragone, 43 Windsor Dr., Little Silver, NJ (US) 07739

(*) Notice: Subject to any disclaimer, the term of this patent is extended or adjusted under 35 U.S.C. 154(b) by 0 days.

(21) Appl. No.: 10/410,845

(22) Filed: Apr. 10, 2003

(65) Prior Publication Data
US 2003/0194181 A1 Oct. 16, 2003

Related U.S. Application Data

(60) Provisional application No. 60/372,707, filed on Apr. 12, 2002.

(51) Int. Cl.⁷ .................. G02B 6/26; G02B 6/42
(52) U.S. Cl. .................. 385/39; 385/24; 385/37; 385/43
(58) Field of Search ............. 385/14, 15, 24, 385/37, 39, 43, 45; 398/89, 87

(56) References Cited

U.S. PATENT DOCUMENTS

| | | | |
|---|---|---|---|
| 4,004,042 A | 1/1977 | Fairbairn | |
| 4,904,042 A | 2/1990 | Dragone | |
| 5,002,350 A | 3/1991 | Dragone | |
| 5,136,671 A | 8/1992 | Dragone | |
| 5,745,618 A | 4/1998 | Li | |
| 6,058,233 A | 5/2000 | Dragone | |
| 6,512,864 B1 * | 1/2003 | Lin et al. | 385/24 |
| 2002/0131704 A1 | 9/2002 | Doerr | |
| 2003/0063858 A1 * | 4/2003 | Bulthuis et al. | 385/37 |
| 2003/0081898 A1 | 5/2003 | Tabuchi et al. | |

* cited by examiner

Primary Examiner—Hemang Sanghavi
(74) Attorney, Agent, or Firm—Mathews, Collins, Shephard & McKay, P.A.

(57) ABSTRACT

An optical interconnection apparatus including waveguide arrays such as waveguide lenses, waveguide gratings and star couplers, has improved efficiency realized by using a periodic array including in each period a combination of two radial waveguides. The array is formed with angular period $\alpha$ between an input circle and an output circle and it includes an input section, connected to the input circle, and an output section connected to the output circle. The input section includes a single waveguide in each period and it is efficiently coupled with minimal loss to the output section, whose waveguides are approximately arranged with period $\alpha/2$ in the final region close to the output circle.

20 Claims, 12 Drawing Sheets